(12) United States Patent
Pierson et al.

(10) Patent No.: US 8,914,648 B1
(45) Date of Patent: Dec. 16, 2014

(54) STATELESS AND STATEFUL IMPLEMENTATIONS OF FAITHFUL EXECUTION

(75) Inventors: Lyndon G. Pierson, Albuquerque, NM (US); Edward L. Witzke, Edgewood, NM (US); Thomas D. Tarman, Edgewood, NM (US); Perry J. Robertson, Albuquerque, NM (US); John M. Eldridge, Bosque Farms, NM (US); Philip L. Campbell, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 1216 days.

(21) Appl. No.: 12/542,072

(22) Filed: Aug. 17, 2009

(51) Int. Cl.
*G06F 11/30* (2006.01)

(52) U.S. Cl.
USPC .......................................... 713/190; 713/189

(58) Field of Classification Search
USPC ........................... 713/189, 190; 711/163, 164
See application file for complete search history.

(56) References Cited

U.S. PATENT DOCUMENTS

| 4,977,596 | A | 12/1990 | Maestas et al. |
| 6,560,727 | B1 | 5/2003 | Pierson et al. |
| 7,362,859 | B1 | 4/2008 | Robertson et al. |
| 2010/0070953 | A1* | 3/2010 | Velten et al. .................. 717/140 |

OTHER PUBLICATIONS

Tarman, Thomas D. et al, "On the Use of Trusted Objects to Enforce Isolation Between Processes and Data", IEEE 0-7803-7436-3/02, 2002, pp. 115-119.

Pierson, Lyndon G. et al, "Secure Computing Using Cryptographic Assurance of Execution Correctness", IEEE 0-7803-8506-3/02, 2004, pp. 239-246.
Campbell, Philip L. et al, "Trusted Objects", IEEE 0-7803-7001-5/01, 2001, pp. 247-248.
Pierson, Lyndon G. et al., "Protection of Distributed Internetworked Computers", IEEE 0-7803-9245-0/05, 2005, 4 pages.
Campbell, Philip L. et al, "Principles of Faithful Execution in the Implementation of Trusted Objects", Sandia Report SAND2003-2328, Jul. 2003, 33 pages, Sandia National Laboratories, Albuquerque, New Mexico.
Campbell, Philip L. et al, "Prototyping Faithful Execution in a Java Virtual Machine", Sandia Report SAND2003-2327, Jul. 2003, 69 pages, Sandia National Laboratories, Albuquerque, New Mexico.

* cited by examiner

*Primary Examiner* — Kambiz Zand
*Assistant Examiner* — Suman Debnath
(74) *Attorney, Agent, or Firm* — Blakely Sokoloff Taylor Zafman LLP

(57) ABSTRACT

A faithful execution system includes system memory, a target processor, and protection engine. The system memory stores a ciphertext including value fields and integrity fields. The value fields each include an encrypted executable instruction and the integrity fields each include an encrypted integrity value for determining whether a corresponding one of the value fields has been modified. The target processor executes plaintext instructions decoded from the ciphertext while the protection engine is coupled between the system memory and the target processor. The protection engine includes logic to retrieve the ciphertext from the system memory, decrypt the value fields into the plaintext instructions, perform an integrity check based on the integrity fields to determine whether any of the corresponding value fields have been modified, and provide the plaintext instructions to the target processor for execution.

23 Claims, 22 Drawing Sheets

TABLE 1: PROTECTION SCHEMES

| Series | Scheme | Description | Field Required? | | | Implements FE? |
|---|---|---|---|---|---|---|
| | | | Value | Integrity | IV[a] | |
| A | | Default format (no protection) | No | | | No |
| B | B0 | Scheme A with stateless geometry | Yes | Yes | No | Yes |
| | B1 | Scheme B0 with 1 translation[b] | | | | |
| | B2 | Scheme B1 with 1 additional translation | | | | |
| | B3 | Scheme B2 with 1 additional translation | | | | |
| | B4 | Scheme B3 with 1 additional translation | | | | |
| | B5 | Scheme B4 with 1 additional translation | | | | |
| | B6 | Scheme B5 with 1 additional translation | | | | |
| C | C0 | Scheme A with stateful geometry | Yes | | | No |
| | C1 | Scheme C0 with bit-chaining (BiCF[c]) | | | | |
| | C2 | " instruction-chaining (ICF[d]) | | | | |
| | C3 | " block-chaining (BlCF[e]) | | | | Yes | a. IV = Initialization Vector.
b. The Integrity Field is not used in B1 but we implement it anyway, as a "don't care," for consistency with the other B series scheme.
c. BiCF = Bit-Chained Stateful.
d. ICF = Instruction-Chained Stateful.
e. BlCF = Block-Chained Stateful.

FIG. 5

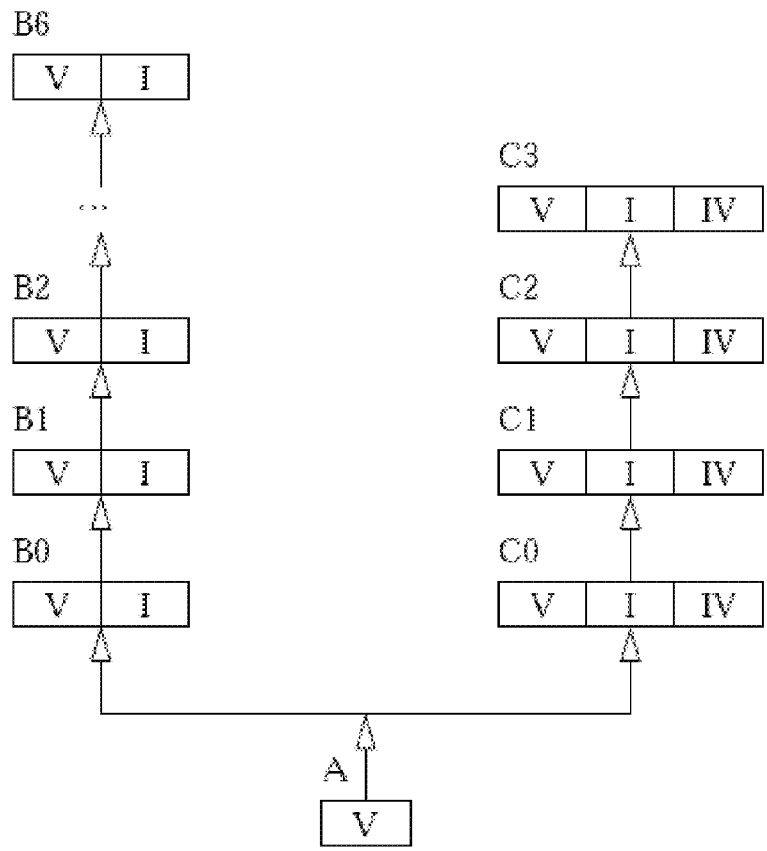
Key:
X
△
|
Y
means X builds on Y
The size of each rectangle suggests the "geometry" (i.e., the number of fields) for each scheme, as follows (we presume that all fields have the same width but this is not required):
 Value Field only
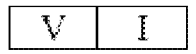 Value Field and Integrity Field
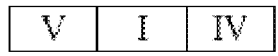 Value Field, Integrity Field, and IV Field
FIG. 6

TABLE 2: VALUE TYPES

| Value Types | | Applicable... | | | | Is Replay Protection Needed? |
|---|---|---|---|---|---|---|
| | | ...Memory Type | ...Access Pattern | ...Protection Type | | |
| | | | | Stateless | Stateful | |
| Instruction | | Read-Only | Sequential | Yes | Yes | No |
| Data | Constant | | Random | | No | No |
| | Variable | Writable | | | | Yes |

TABLE 3: VALUE TYPES (ALTERNATIVE ARRANGEMENT)

| | | Value Types | | |
|---|---|---|---|---|
| | | Instruction | Data | |
| | | | Constant | Variable |
| Memory Type | | Read-Only | | Writable |
| Access Pattern | | Sequential | | Random |
| Protection Type | Stateless | Yes | | |
| | Stateful | Yes | | No |
| Is Replay Protection Needed? | | No | | Yes |

TABLE 5: MEMORY OPERATIONS

| | | Paged | |
|---|---|---|---|
| | | No | Yes |
| Segmented | No | ① Memory is neither paged nor segmented. | ② Memory is paged. |
| | Yes | ④ Memory is segmented. | ③ Memory is both paged and segmented (i.e., it uses paged segments). |

FIG. 7

TABLE 4: NOTATIONS

| | Notation | Meaning |
|---|---|---|
| Stateless & Stateful | v | A value (i.e., an instruction or data; see Table 2 on page 18). |
| | a | The address of value v. (Used for stateless schemes only.) |
| | s | A value v or an address a. |
| | k, $k_j$ | Generic keys. (A key is a data item that is unavailable to the adversary. When a key is outside of a Protected Volume it is presumed to be encrypted or otherwise protected.) "k" is used in this table and "$k_j$" elsewhere in this report. Both refer to actual keys, namely b, c, d, e, f, g, h, or i (see below). |
| | $\oplus$ | The exclusive-or (XOR) operator: $0 = 0 \oplus 0 = 1 \oplus 1$; $1 = 0 \oplus 1 = 1 \oplus 0$. (Note: for the purposes of this document this symbol also substitutes for and represents the exclusive-nor (XNOR) operator) |
| | T(k,s) | A function that we call "translation" that accepts two inputs—(1) a key and (2) a value or an address—and generates an output that is some function of that value or address based on that key. The implementation for T that we presume in this report is described here in Section 3.4. |
| | k(s) | An abbreviation of "T(k,s)." |
| | b, c, d, e | Invertible keys. b and c are inverses; and d and e are inverses. e is referred to as the "encryption" key. d is referred to as the "decryption" key. b and c are unrelated to d and e. |
| | f, g, h, i | Non-invertible keys. Generally speaking, non-invertible keys provide more protection than invertible keys because the keyspace is larger: $2^n$ vs. (n/4)!, respectively for n-bit keys and counting all possible keys (see the description of the translation function here in Section 3.4). We presume that the set of invertible keys is a proper subset of the set of non-invertible keys: "non-invertible" really means "not necessarily invertible" and not "not invertible." |
| Stateless only | $iv_j$ | The initialization vector (IV) for the instruction at address j. |
| | $I_j$ | The Integrity Field for the instruction at address j. |
| | $P_j$ | The plaintext of the instruction at address j. |
| | $C_j$ | The ciphertext of the instruction at address j. |
| | $A_j$ | Address j. |

FIG. 8

TABLE 6: STATELESS ALGORITHMS

| Algorithm | Value Field | Integrity Field | Translations | XORs | Parallel Steps |
|---|---|---|---|---|---|
| 1 | $k_1(v \oplus a)$ | $k_1(v \oplus a)$[a] | 1 | 1 | 3[b] |
| 2 | $k_1(v \oplus a)$ | $k_2(v \oplus a)$ | 2 | 2 | 2 |
| 3 | $k_1(v \oplus k_3(a))$ | $k_2(v \oplus a)$ | 3 | 2 | 3 |
| 4 | $k_1(v \oplus k_3(a))$ | $k_2(v \oplus k_4(a))$ | 4 | 2 | 3 |
| 5 | $k_1(k_5(v) \oplus k_3(a))$ | $k_2(v \oplus k_4(a))$ | 5 | 2 | 3 |
| 6 | $k_1(k_5(v) \oplus k_3(a))$ | $k_2(k_6(v) \oplus k_4(a))$ | 6 | 2 | 3 | a. As noted in the text, for this algorithm (and this algorithm alone) the Integrity Field is a copy of the Value Field, thereby eliminating the need for a second translation.

b. One step for the XOR, a second for the translation, and a third to copy the Value Field into the Integrity Field.

TABLE 7: B SERIES SCHEMES (APPLICATION OF PROTECTION)

| Scheme | Configuration | Value Field | Integrity Field |
|---|---|---|---|
| B0 |  | v |  |
| B1 | <e> | $e(v \oplus a)$ | $e(v \oplus a)$ |
| B2 | <ef> | $e(v \oplus a)$ | $f(v \oplus a)$ |
| B3 | <egf> | $e(v \oplus g(a))$ | $f(v \oplus a)$ |
| B4 | <egfh> | $e(v \oplus g(a))$ | $f(v \oplus h(a))$ |
| B5 | <ecgfh> | $e(c(v) \oplus g(a))$ | $f(v \oplus h(a))$ |
| B6 | <ecgfih> | $e(c(v) \oplus g(a))$ | $f(i(v) \oplus h(a))$ |

FIG. 9

TABLE 8: B SERIES SCHEMES (REMOVAL OF PROTECTION)

| Scheme | Configuration | Value Field | Integrity Field |
|---|---|---|---|
| B0 |  | v |  |
| B1 | <d> | $v = d(VF) \oplus a$[a] | $IF = e(v \oplus a)?$[b] |
| B2 | <df> | | $IF = f(v \oplus a)?$ |
| B3 | <dgf> | $v = d(VF) \oplus g(a)$ | |
| B4 | <dgfh> | | $IF = f(v \oplus h(a))?$ |
| B5 | <bdgfh> | $v = b(d(VF) \oplus g(a))$ | |
| B6 | <bdgfih> | | $IF = f(i(v) \oplus h(a))?$ | a. That is, recover v by decrypting the Value Field, then XORing with a.
b. That is, the integrity check clears if the Integrity Field equals the computed value $e(v \oplus a)$.

TABLE 9: B' SERIES SCHEMES USING ONLY ONE KEY (APPLICATION OF PROTECTION)

| Scheme | Configuration | Value Field | Integrity Field |
|---|---|---|---|
| B0' |  | v |  |
| B1' | <e> | $e(v \oplus a)$ | $e(v \oplus a)$ |
| B2' | <ed> | | $d(v \oplus a)$ |
| B3' | <edd> | $e(v \oplus d(a))$ | |
| B4' | <edde> | | $d(v \oplus e(a))$ |
| B5' | <eddde> | $e(d(v) \oplus d(a))$ | |
| B6' | <edddee> | | $d(e(v) \oplus e(a))$ |

FIG. 10

TABLE 10: ALGORITHM 7; PBC MODE (SHOWN ALGEBRAICALLY)

| Function | Algorithm |
|---|---|
| Encryption | $C_0 = IV \oplus e(P_0)$ |
| | $C_1 = P_0 \oplus e(P_1)$ |
| | $C_2 = P_1 \oplus e(P_2)$ |
| | ... |
| Decryption | $P_0 = d(IV \oplus C_0)$ |
| | $P_1 = d(P_0 \oplus C_1)$ |
| | $P_2 = d(P_1 \oplus C_2)$ |
| | ... |

TABLE 11: ALGORITHM 8; COMBINED CHAIN

| Function | Address | Field | Chain |
|---|---|---|---|
| Application of Protection | 0 | Instruction | $C_0 = IV \oplus e(P_0)$ |
| | | Integrity | $I_0 = P_0 \oplus e(f(P_0))$ |
| | 1 | Instruction | $C_1 = f(P_0) \oplus e(P_1)$ |
| | | Integrity | $I_1 = P_1 \oplus e(f(P_1))$ |
| | 2 | Instruction | $C_2 = f(P_1) \oplus e(P_2)$ |
| | | Integrity | $I_2 = P_2 \oplus e(f(P_2))$ |
| | ... | | |
| Removal of Protection | 0 | Instruction | $P_0 = d(IV \oplus C_0)$ |
| | | Integrity Check | $I_0 = P_0 \oplus e(f(P_0))?^a$ |
| | 1 | Instruction | $P_1 = d(f(P_0) \oplus C_1)$ |
| | | Integrity Check | $I_1 = P_1 \oplus e(f(P_1))?$ |
| | 2 | Instruction | $P_2 = d(f(P_1) \oplus C_2)$ |
| | | Integrity Check | $I_2 = P_2 \oplus e(f(P_2))?$ |
| | ... | | | a: the integrity check clears if the Integrity Field equals the computed value $P_0 \oplus e(f(P_0))$

FIG. 12

TABLE 12: ALGORITHM 9; TWO CHAINS

| Function | Address | Instruction Chain | Integrity Chain |
|---|---|---|---|
| Application of Protection | 0 | $C_0 = IV \oplus e(P_0)$ | $I_0 = f(IV) \oplus g(P_0)$ |
| | 1 | $C_1 = P_0 \oplus e(P_1)$ | $I_1 = f(P_0) \oplus g(P_1)$ |
| | 2 | $C_2 = P_1 \oplus e(P_2)$ | $I_2 = f(P_1) \oplus g(P_2)$ |
| | ... | | |
| Removal of Protection | 0 | $P_0 = d(IV \oplus C_0)$ | $I_0 = f(IV) \oplus g(P_0)$ ? |
| | 1 | $P_1 = d(P_0 \oplus C_1)$ | $I_1 = f(P_0) \oplus g(P_1)$ ? |
| | 2 | $P_2 = d(P_1 \oplus C_2)$ | $I_2 = f(P_1) \oplus g(P_2)$ ? |
| | ... | | |

FIG. 13

TABLE 13: ALGORITHM 10; ANCHORED CHAIN

| Function | Address | Instruction Chain | Integrity Chain |
|---|---|---|---|
| Application of Protection | 0 | $C_0 = IV \oplus e(P_0)$ | $I_0 = f(IV) \oplus g(f(P_0 \oplus A_0))$ |
| | 1 | $C_1 = P_0 \oplus e(P_1)$ | $I_1 = f(P_0 \oplus A_0) \oplus g(f(P_1 \oplus A_1))$ |
| | 2 | $C_2 = P_1 \oplus e(P_2)$ | $I_2 = f(P_1 \oplus A_1) \oplus g(f(P_2 \oplus A_2))$ |
| | ... | | |
| Removal of Protection | 0 | $P_0 = d(IV \oplus C_0)$ | $I_0 = f(IV) \oplus g(f(P_0 \oplus A_0))$ ? |
| | 1 | $P_1 = d(P_0 \oplus C_1)$ | $I_1 = f(P_0 \oplus A_0) \oplus g(f(P_1 \oplus A_1))$ ? |
| | 2 | $P_2 = d(P_1 \oplus C_2)$ | $I_2 = f(P_1 \oplus A_1) \oplus g(f(P_2 \oplus A_2))$ ? |
| | ... | | |

TABLE 14: ALGORITHM 11; ANCHORED CHAIN (MAXIMIZED)

| Function | Address | Instruction Chain | Integrity Chain |
|---|---|---|---|
| Application of Protection | 0 | $C_0 = IV \oplus e(P_0)$ | $I_0 = f(IV) \oplus g(f(h(P_0) \oplus i(A_0)))$ |
| | 1 | $C_1 = P_0 \oplus e(P_1)$ | $I_1 = f(h(P_0) \oplus i(A_0)) \oplus g(f(h(P_1) \oplus i(A_1)))$ |
| | 2 | $C_2 = P_1 \oplus e(P_2)$ | $I_2 = f(h(P_1) \oplus i(A_1)) \oplus g(f(h(P_2) \oplus i(A_2)))$ |
| | ... | | |
| Removal of Protection | 0 | $P_0 = d(IV \oplus C_0)$ | $I_0 = f(IV) \oplus g(f(h(P_0) \oplus i(A_0)))$ ? |
| | 1 | $P_1 = d(P_0 \oplus C_1)$ | $I_1 = f(h(P_0) \oplus i(A_0)) \oplus g(f(h(P_1) \oplus i(A_1)))$ ? |
| | 2 | $P_2 = d(P_1 \oplus C_2)$ | $I_2 = f(h(P_1) \oplus i(A_1)) \oplus g(f(h(P_2) \oplus i(A_2)))$ ? |
| | ... | | |

FIG. 14

TABLE 15: ALGORITHM 12; ANCHORED FIELDS

| Function | Address | Instruction Chain | Integrity Field |
|---|---|---|---|
| Application of Protection | 0 | $C_0 = IV \oplus e(P_0)$ | $I_0 = f(P_0 \oplus A_0)$ |
| | 1 | $C_1 = P_0 \oplus e(P_1)$ | $I_1 = f(P_1 \oplus A_1)$ |
| | 2 | $C_2 = P_1 \oplus e(P_2)$ | $I_2 = f(P_2 \oplus A_2)$ |
| | ... | | |
| Removal of Protection | 0 | $P_0 = d(IV \oplus C_0)$ | $I_0 = f(P_0 \oplus A_0)$ ? |
| | 1 | $P_1 = d(P_0 \oplus C_1)$ | $I_1 = f(P_1 \oplus A_1)$ ? |
| | 2 | $P_2 = d(P_1 \oplus C_2)$ | $I_2 = f(P_2 \oplus A_2)$ ? |
| | ... | | |

TABLE 16: ALGORITHM 13; ANCHORED FIELDS (MAXIMIZED)

| Function | Address | Instruction Chain | Integrity Field |
|---|---|---|---|
| Application of Protection | 0 | $C_0 = IV \oplus e(P_0)$ | $I_0 = f(g(P_0) \oplus h(A_0))$ |
| | 1 | $C_1 = P_0 \oplus e(P_1)$ | $I_1 = f(g(P_1) \oplus h(A_1))$ |
| | 2 | $C_2 = P_1 \oplus e(P_2)$ | $I_2 = f(g(P_2) \oplus h(A_2))$ |
| | ... | | |
| Removal of Protection | 0 | $P_0 = d(IV \oplus C_0)$ | $I_0 = f(g(P_0) \oplus h(A_0))$? |
| | 1 | $P_1 = d(P_0 \oplus C_1)$ | $I_1 = f(g(P_1) \oplus h(A_1))$? |
| | 2 | $P_2 = d(P_1 \oplus C_2)$ | $I_2 = f(g(P_2) \oplus h(A_2))$? |
| | ... | | |

FIG. 15

TABLE 17: STATEFUL ALGORITHMS SUMMARY (APPLICATION OF PROTECTION)

| Algorithm | Instruction Chain, or Instruction & Integrity Chain | Integrity Chain or Integrity Field | Name |
|---|---|---|---|
| 7 | $C_0 = IV \oplus e(P_0)$<br>$C_1 = P_0 \oplus e(P_1)$ | | PBC |
| 8 | $C_0 = IV \oplus e(P_0)$<br>$I_0 = P_0 \oplus e(f(P_0))$<br>$C_1 = f(P_0) \oplus e(P_1)$<br>$I_1 = P_1 \oplus e(f(P_1))$ | | Combined Chain |
| 9 | | $I_0 = f(IV) \oplus g(P_0)$<br>$I_1 = f(P_0) \oplus g(P_1)$ | Two Chains |
| 10 | | $I_0 = f(IV) \oplus g(f(P_0 \oplus A_0))$<br>$I_1 = f(P_0 \oplus A_0) \oplus g(f(P_1 \oplus A_1))$ | Anchored Chain |
| 11 | $C_0 = IV \oplus e(P_0)$<br>$C_1 = P_0 \oplus e(P_1)$ | $I_0 = f(IV) \oplus g(f(h(P_0) \oplus i(A_0)))$<br>$I_1 = f(h(P_0) \oplus i(A_0)) \oplus g(f(h(P_1) \oplus i(A_1)))$ | Anchored Chain (Maximized) |
| 12 | | $I_0 = f(P_0 \oplus A_0)$<br>$I_1 = f(P_1 \oplus A_1)$ | Anchored Fields |
| 13 | | $I_0 = f(g(P_0) \oplus h(A_0))$<br>$I_1 = f(g(P_1) \oplus h(A_1))$ | Anchored Fields (Maximized) | a. This table shows the application of protection only and not the removal of protection

FIG. 16

TABLE 18: STATEFUL ALGORITHMS; COMPUTATION REQUIREMENTS

| Algorithm | Name | Translations | XORs | Parallel Steps |
|---|---|---|---|---|
| 7 | PBC | 1 | 1 | 2 |
| 8 | Combined Chain |  | 2 | 3 |
| 9 | Two Chains | 3 | 2 | 2 |
| 10 | Anchored Chain |  | 3 | 4 |
| 11 | Anchored Chain (Maximized) | 5 | 3 | 5 |
| 12 | Anchored Fields | 2 | 2 | 2 |
| 13 | Anchored Fields (Maximized) | 4 | 2 | 3 |

TABLE 19: IV TYPES

| IV Type | Associated Instruction | Instruction that Uses the IV | Duplicate Values | Schemes that Use the IV Type |
|---|---|---|---|---|
| instruction IV | Any instruction | The associated instruction | Discouraged | C1 |
| block IV | The first instruction of a block | The associated instruction | Discouraged | C2, C3[a] |
| jump IV | A jump instruction | The target of the jump | Required[b] | C3 | a. C3 uses exactly one block IV, for the first block of the program.
b. For jump instructions with the same target.

FIG. 17

TABLE 20: MEMORY DIAGRAM FOR C1

| Address | Field | Value |
|---|---|---|
| 0 | IV | $iv_0$ |
| | Instruction | $C_0 = iv_0 \oplus e(P_0)$ |
| | Integrity | $I_0 = P_0 \oplus e(f(P_0))$ |
| 1 | IV | $iv_1$ |
| | Instruction | $C_1 = iv_1 \oplus e(P_1)$ |
| | Integrity | $I_1 = P_1 \oplus e(f(P_1))$ |
| 2 | IV | $iv_2$ |
| | Instruction | $C_2 = iv_2 \oplus e(P_2)$ |
| | Integrity | $I_2 = P_2 \oplus e(f(P_2))$ |
| ... | | |

TABLE 21: MEMORY DIAGRAM FOR C2

| Address | Field | Value |
|---|---|---|
| 0 | IV | $iv_0$ |
| | Instruction | $C_0 = iv_0 \oplus e(P_0)$ |
| | Integrity | $I_0 = P_0 \oplus e(f(P_0))$ |
| 1 | IV | 0 |
| | Instruction | $C_1 = f(P_0) \oplus e(P_1)$ |
| | Integrity | $I_1 = P_1 \oplus e(f(P_1))$ |
| 2 | IV | 0 |
| | Instruction | $C_2 = f(P_1) \oplus e(P_2)$ |
| | Integrity | $I_2 = P_2 \oplus e(f(P_2))$ |
| ... | | |
| 50 | IV | $iv_{50}$ |
| | Instruction | $C_{50} = iv_{50} \oplus e(P_{50})$ |
| | Integrity | $I_{50} = P_{50} \oplus e(f(P_{50}))$ |
| 51 | IV | 0 |
| | Instruction | $C_{51} = f(P_{50}) \oplus e(P_{51})$ |
| | Integrity | $I_{51} = P_{51} \oplus e(f(P_{51}))$ |
| 52 | IV | 0 |
| | Instruction | $C_{52} = f(P_{51}) \oplus e(P_{52})$ |
| | Integrity | $I_{52} = P_{52} \oplus e(f(P_{52}))$ |

FIG. 18

TABLE 22: MEMORY DIAGRAM FOR C3

| Address | Field | Value |
|---|---|---|
| 0 | IV | 0 |
| | Instruction | $C_0 = ivr^a \oplus e(P_0)$ |
| | Integrity | $I_0 = P_0 \oplus e(f(P_0))$ |
| 1 | IV | 0 |
| | Instruction | $C_1 = f(P_0) \oplus e(P_1)$ |
| | Integrity | $I_1 = P_1 \oplus e(f(P_1))$ |
| 2 | IV | 0 |
| | Instruction | $C_2 = f(P_1) \oplus e(P_2)$ |
| | Integrity | $I_2 = P_2 \oplus e(f(P_2))$ |
| ... | | |
| 20 | IV | $iv_{50}$ |
| | Instruction | $C_{20} = f(P_{19}) \oplus e(P_{20})$ |
| | Integrity | $I_{20} = P_{20} \oplus e(f(P_{20}))$ |

← jump to 50

| | | |
|---|---|---|
| ... | | |
| 50 | IV | 0 |
| | Instruction | $C_{50} = ivr \oplus e(P_{50})$ |
| | Integrity | $I_{50} = P_{50} \oplus e(f(P_{50}))$ |
| 51 | IV | 0 |
| | Instruction | $C_{51} = f(P_{50}) \oplus e(P_{51})$ |
| | Integrity | $I_{51} = P_{51} \oplus e(f(P_{51}))$ |
| 52 | IV | 0 |
| | Instruction | $C_{52} = f(P_{51}) \oplus e(P_{52})$ |
| | Integrity | $I_{52} = P_{52} \oplus e(f(P_{52}))$ |
| ... | | |
| 80 | IV | $iv_{50}$ |
| | Instruction | $C_{80} = f(P_{79}) \oplus e(P_{80})$ |
| | Integrity | $I_{80} = P_{80} \oplus e(f(P_{80}))$ |

← jump to 50 a. "ivr" is an abbreviation for the nonce of "IV Register." Since the contents of the IV register for non-initial instructions in a sequence is $f(P_{i-1})$, we show the formula as $C_i = f(P_{i-1}) \oplus e(P_i)$ whenever we can. Otherwise it appears as $C_i = ivr \oplus e(P_i)$. See accompanying text.

FIG. 19

TABLE 23: IV FIELDS AND IV REGISTER USAGE

| Scheme | What do we use as the IV? | | After the instruction completes execution, to what do we set the IV register? | |
|---|---|---|---|---|
| C1 | Use the value of the instruction's IV field. | | (C1 does not use an IV register) | |
| C2 | If the value of the instruction's IV field is... | | Set the IV register to the value of the freshly-computed IV. | |
|  | ...zero, use the value of the IV register. | ...non-zero, use the value of the IV field. | | |
| C3 | Use the value of the IV register. | | If the value of the instruction's IV field is... | |
|  |  |  | ...zero, use the freshly-computed IV, which should be $f(P_i)$. | ...non-zero, use the value of the instruction's IV field. |

TABLE 24: ITEMS CHAINED, PROTECTION AFFORDED

| Scheme | Item Chained | Protects Against Swapping of... | | |
|---|---|---|---|---|
|  |  | ...Bits | ...Instructions | ...Blocks |
| C1 | bits[a] | Yes | No | No |
| C2 | bits and instructions | Yes | Yes | No |
| C3 | bits, instructions, and blocks | Yes | Yes | Yes | a. At least conceptually.

FIG. 20

STATELESS AND STATEFUL IMPLEMENTATIONS OF FAITHFUL EXECUTION

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to cryptography, and in particular but not exclusively, relates to the faithful execution of a software program.

BACKGROUND INFORMATION

Today's general-purpose processors, based on the Von Neumann Architecture, allow the execution of any arbitrary sequence of instructions. While this has lead to wide spread use, it also represents a major vulnerability as malicious code can easily be substituted and executed (as in a software virus). Since current processor architectures permit code and data to exist in the same memory space, it is relatively easy for one program to insert malicious code (as data) into the area in memory where another program is executing code. Programs that attempt to protect data from disclosure (for instance by using an encryption algorithm) are fraught with difficulty since the keys and instructions used by the program to encrypt its data can be inspected and reverse-engineered.

There are three general models of software development: waterfall, spiral, and evolutionary. FIG. 1 illustrates a classic software lifecycle 100 of a typical executable program. The five phases in the classic or waterfall model are Requirements, Specification, Implementation & Unit Testing, Integration & System Testing, and Operations & Maintenance. The last phase can be sub-divided into five sub-phases: Compile, Package, Distribute, Install, and Execute, with the final sub-phase further divided into load, fetch, and decode phases. The first four phases along with the compile and package sub-phases are typically performed within the trusted volume(s) of the developer/publisher and therefore have limited opportunity for malicious intervention. However, distribute, install, load, and fetch phases are highly susceptible to malicious intervention by third parties or third party viruses.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 5 (TABLE 1) is a table summarizing protection schemes, in accordance with embodiments of the invention.

FIG. 6 illustrates features of the protection schemes, in accordance with embodiments of the invention.

FIG. 7 (TABLES 2, 3, 5) includes tables illustrating value types and memory operations, in accordance with embodiments of the invention.

FIG. 8 (TABLE 4) is a table summarizing notations, in accordance with embodiments of the invention.

FIG. 9 (TABLES 6,7) includes tables illustrating features of stateless encryption algorithms and B Series Schemes, in accordance with embodiments of the invention.

FIG. 10 (TABLES 8,9) includes tables illustrating features of B Series Schemes, in accordance with embodiments of the invention.

FIG. 12 (TABLES 10, 11) includes tables illustrating features of stateful encryption/decryption algorithms, in accordance with embodiments of the invention.

FIG. 13 (TABLE 12) is a table illustrating features of a stateful encryption/decryption algorithm, in accordance with an embodiment of the invention.

FIG. 14 (TABLES 13, 14) includes tables illustrating features of stateful encryption/decryption algorithms, in accordance with embodiments of the invention.

FIG. 15 (TABLES 15, 16) includes tables illustrating features of stateful encryption/decryption algorithms, in accordance with embodiments of the invention.

FIG. 16 (TABLE 17) is a table summarizing features of stateful encryption algorithms, in accordance with embodiments of the invention.

FIG. 17 (TABLES 18, 19) includes tables illustrating features of stateful encryption/decryption algorithms and initialization vector (IV) types, in accordance with embodiments of the invention.

FIG. 18 (TABLES 20, 21) includes tables illustrating features of two stateful encryption/decryption schemes, in accordance with embodiments of the invention.

FIG. 19 (TABLE 22) is a table illustrating features of a stateful encryption/decryption scheme, in accordance with an embodiment of the invention.

FIG. 20 (TABLES 23, 24) includes tables summarizing features of three stateful encryption/decryption schemes, in accordance with embodiments of the invention.

DETAILED DESCRIPTION

Figure 1:
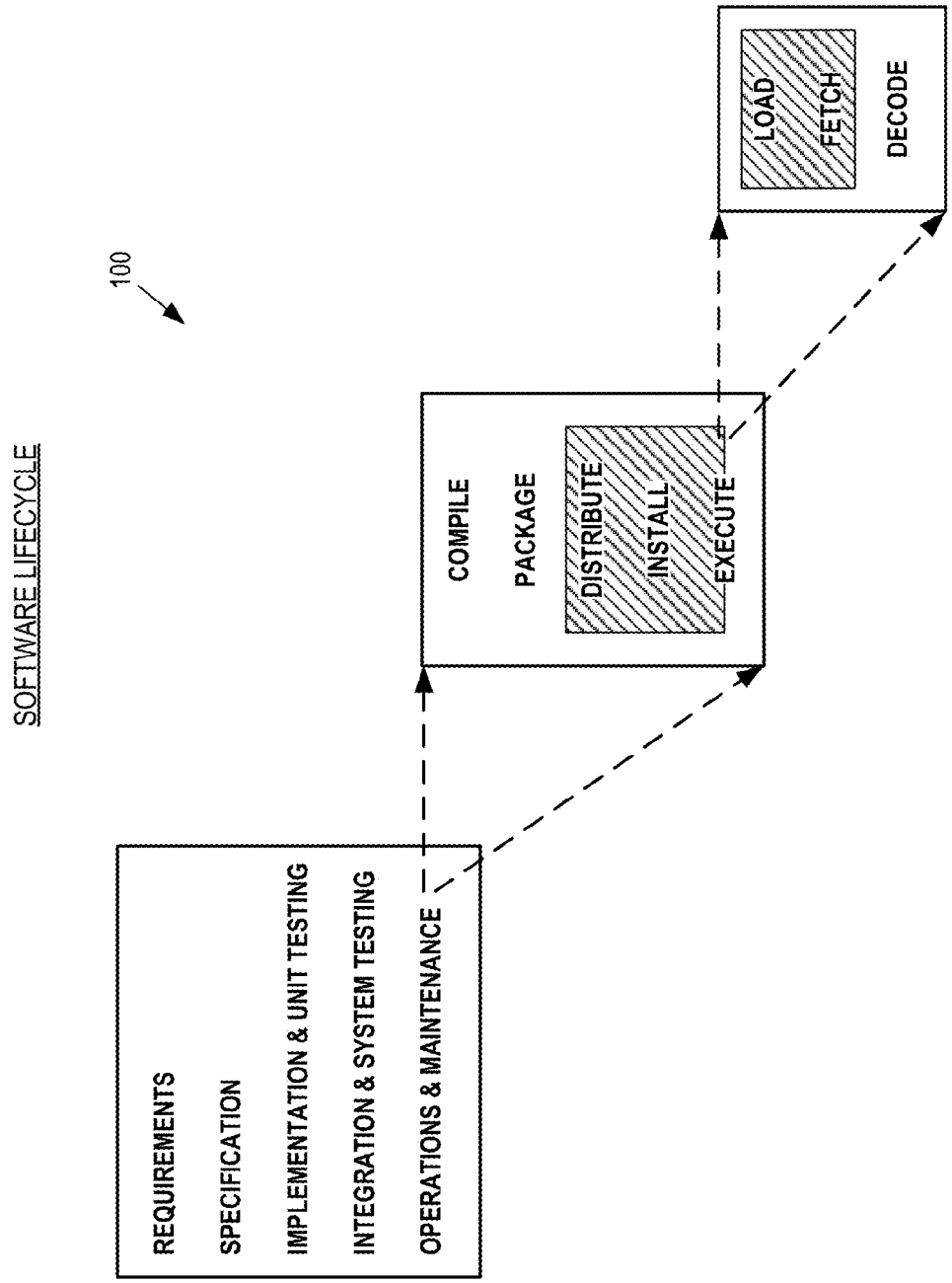
FIG. 1 is a block diagram illustrating the software lifecycle of a typical program.

Embodiments of an architecture and various techniques for faithful execution of a software program are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. A "trusted volume" or "protected volume" is defined herein as the computing machinery within which instructions and data are assumed to be physically protected from an adversary. "Program integrity" is the protection, which enables the detection of changes in the bits comprising a program as specified by a developer, for the time that the program is outside a trusted volume. Program integrity may include the aggregation of two elements: "instruction integrity" and "sequence integrity." "Instruction integrity" is the detection of changes in the bits within an instruction or block of instructions. "Sequence integrity" is the detection in the locations of instructions within a program. "Faithful Execution" (FE) describes the protection of software that begins when the software leaves the control of the developer and ends with its proper execution within the trusted volume of a target processor. FE may be characterized as providing privacy, value integrity, and location integrity, as discussed below. A "translation" is an encryption process. Throughout this document a custom cipher is used; however, other ciphers may be used, such as Electronic Code Book ("ECB"), Data Encryption Standard ("DES"), Advanced Encryption Standard ("AES"), or otherwise. An "algorithm" describes the method by which plain text data is modified, in some embodiments forming a one-to-one relationship between the input bits and output bits. This is normally achieved by an arrangement of translations and XORs or XNORs (referring to the logic functions). It should be appreciated that the XOR function described throughout this document may be substituted for an XNOR function or other invertible logic functions. A "scheme" is the manner in which protection is applied and removed & checked. A scheme is based on an algorithm.

FE may be implemented using any of a number of "stateless" schemes or "stateful" schemes. The "state" described here refers to a connection between lexically adjacent instructions, or equivalently, groups of instructions (as in insuring that one instruction follows another during execution). The stateless implementation schemes protect each instruction individually: there is no connection between the protection applied to individual instructions. The stateful implementation schemes, on the other hand, protect a sequence of instructions, i.e. state is carried from one instruction to the next. In general, stateful implementations apply to memory regions that are accessed sequentially (e.g., instructions).

Figure 2:
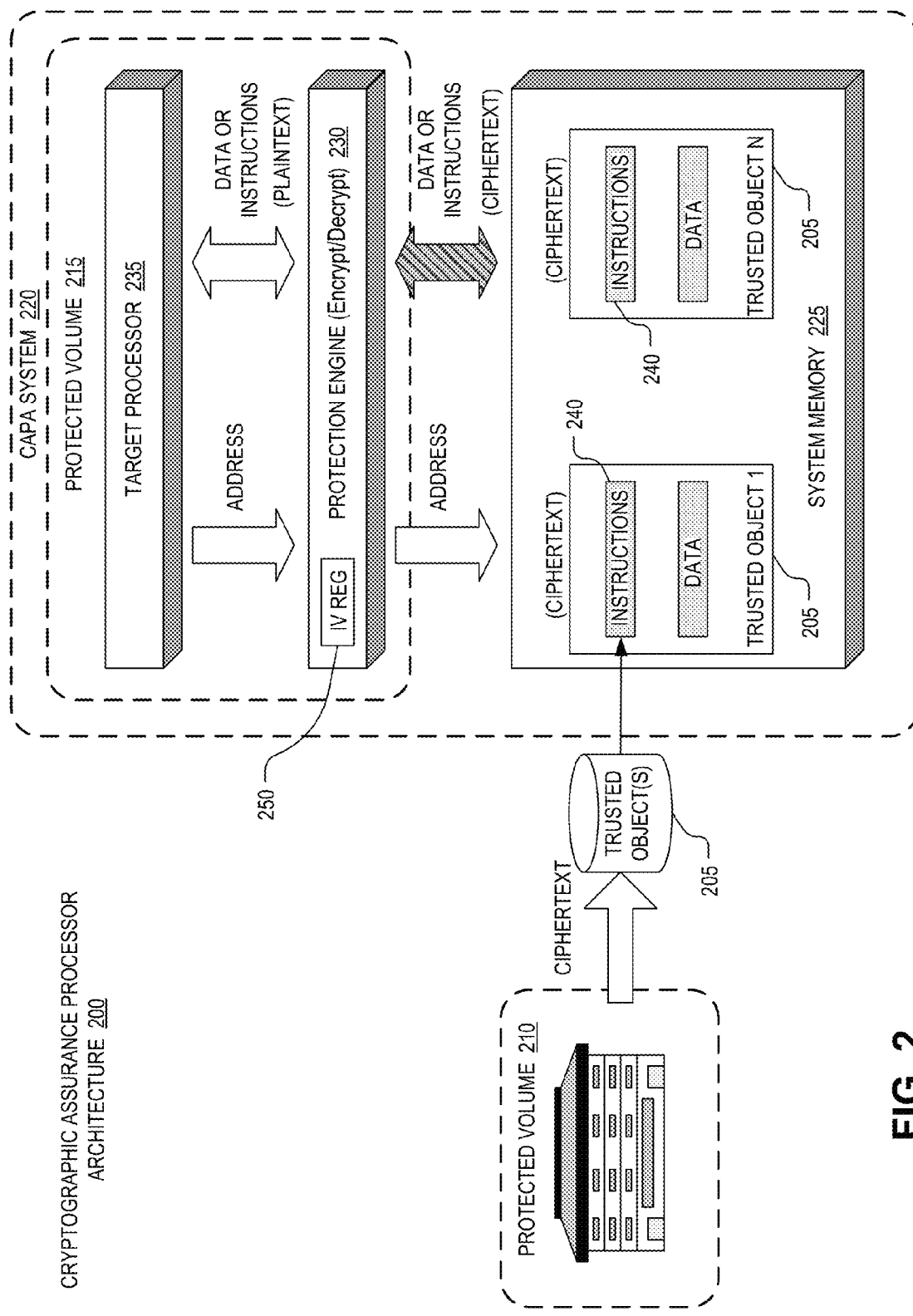
FIG. 2 is a functional block diagram illustrating a cryptographic assurance processor architecture, in accordance with an embodiment of the invention.

FIG. 2 is a functional block diagram illustrating a Cryptographic Assurance Processor Architecture ("CAPA") 200 for implementing FE techniques, in accordance with an embodiment of the invention. CAPA 200 illustrates how a ciphertext in the form of one or more trusted objects 205 can be delivered from a first protected volume 210 to a second protected volume 215 for FE on the second protected volume 215. Protected volume 215 is included within a CAPA system 220. The illustrated embodiment of CAPA system 220 includes protected volume 215 and system memory 225 (external to protected volume 215). The illustrated embodiment of protected volume 215 includes a protection engine 230 and a target processor 235.

CAPA system 220 provides both the integrity (protection from illicit modification) and the confidentiality (privacy) of the instructions within trusted objects 205 even if the adversary owns CAPA system 220. In other words, the adversary cannot determine the sequence of instructions 240 within trusted objects 205, nor can the adversary change the instruction sequence in a goal-oriented way. FE protects instruction sequences from corruption or subversion during code distribution and storage by cryptographically sealing instructions 240, and at execution time, decrypting and authenticating instructions 240 within protected volume 215 of CAPA system 220. FE can be implemented by cryptographically "shrink-wrapping" executable code in a trusted verification facility (e.g., protected volume 210) where the correctness of the code has been determined. The shrink-wrap process may be performed using a compiler capable of performing the encryption algorithms/schemes discussed below.

At run-time, protection engine 230 (within protected volume 215), fetches the encrypted instructions (ciphertext) 240 from the unprotected system memory 225 of CAPA system 220, removes the protection to retrieve the original unencrypted or "plaintext instruction(s)," authenticates the instruction(s) and insures sequence integrity of a particular instruction, and provides the plaintext instruction(s) to target process 235 for execution, if the authentication is successful. In other words, protection engine 230 is a mechanism that removes cryptographic protection from instructions and data as they move from system memory 225 into target processor 235 and applies cryptographic protection as data moves in the other direction. This method of protection (i.e., FE) provides significant code assurance and privacy over a large portion of the software lifecycle. This lifecycle includes the period from the time the instructions are shrink-wrapped in a trusted facility (e.g., protected volume 210) through the distribution, installation, loading, and fetching phases, up to the point where the instructions or data are decoded by target processor 235.

FE differs from previous attempts to ensure code correctness in a variety of ways. For example, in addition to providing privacy, FE provides "sequence integrity" and "instruction integrity." FE can be tailored to provide transparency (integrity only) and non-transparency (privacy and integrity) and for use with exportable algorithms.

In one embodiment CAPA system 220 may be implemented as a server, desktop computer, laptop computer, a special purpose processing system, various types of remotely located processing systems (e.g., satellite processor, surveillance processor, etc.), or otherwise. In one embodiment, protection engine 230 is a separate hardware processor core coupled between target processor 235 and system memory 225. Protection engine 230 may be implemented as an application specific integrated circuit ("ASIC") or a general purpose programmable processor including its own programmable code store (e.g., flash memory). Protection engine 230 may be integrated onto a single semiconductor die along with target processor 235 or coupled to target processor 235 with a secure communication link. In yet another embodiment, target processor 235 may be a multiple core processor and protection engine 230 may be implemented as a virtual processor core, such as a virtual machine operating on a dedicated one of the processing cores of target processor 235.

In the illustrated embodiment, protection engine 230 includes an initialization vector (IV) register 250 for temporarily storing IV values. These IV values are periodically used by protection engine 230 to initialize the decryption algorithms for select instructions, discussed in detail below. The IV values may be cryptographically shrink-wrapped within trusted objects 205 using conventional encryption techniques, and/or securely stored within protected volume 215.

Figure 3:
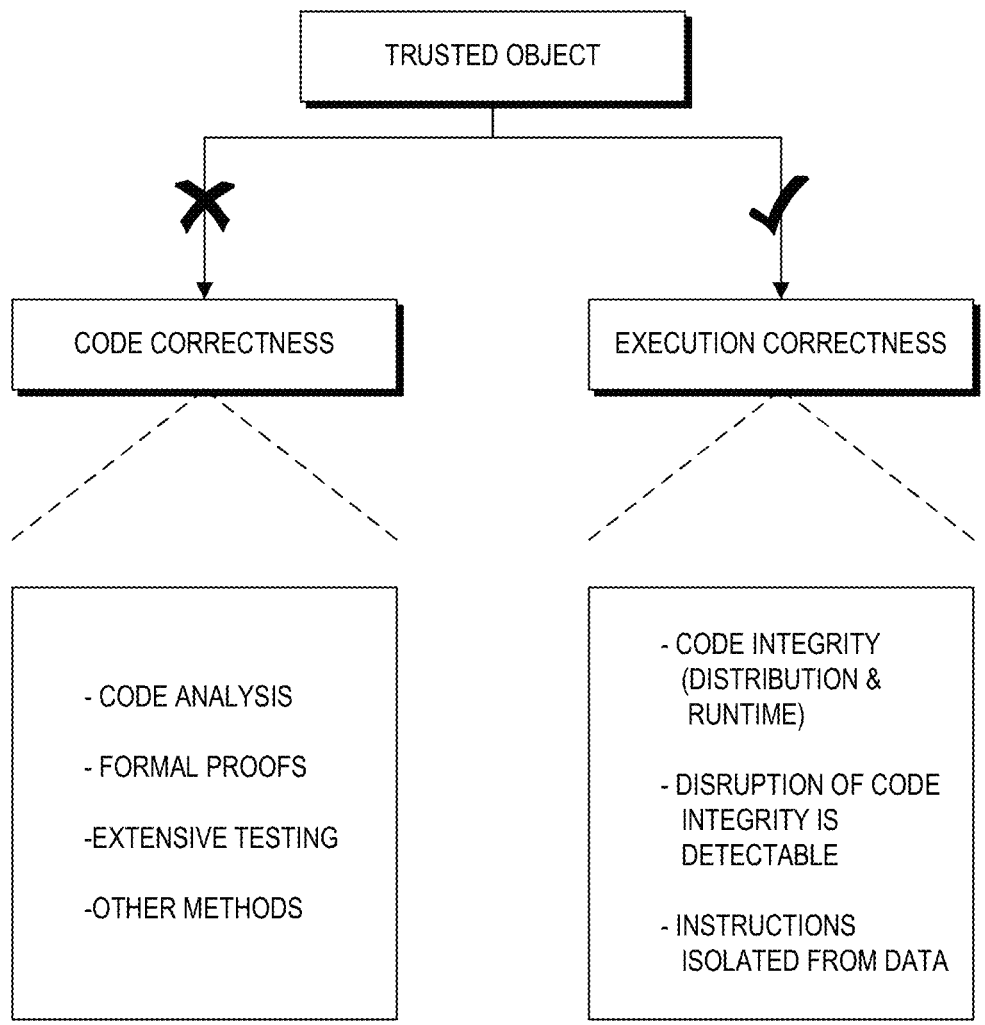
FIG. 3 is a chart illustrating attributes of a trusted object (ciphertext), in accordance with an embodiment of the invention.

FIG. 3 illustrates some attributes of trusted objects used for FE, in accordance with embodiments of the invention. FE can provide execution correctness to a program including code integrity during distribution and runtime, detection of code modification, and even isolate instructions from data to provide different levels or types of protection thereto. However, FE does not ensure code correctness (e.g., was the code properly designed and vetted by the publisher).

Figure 4:
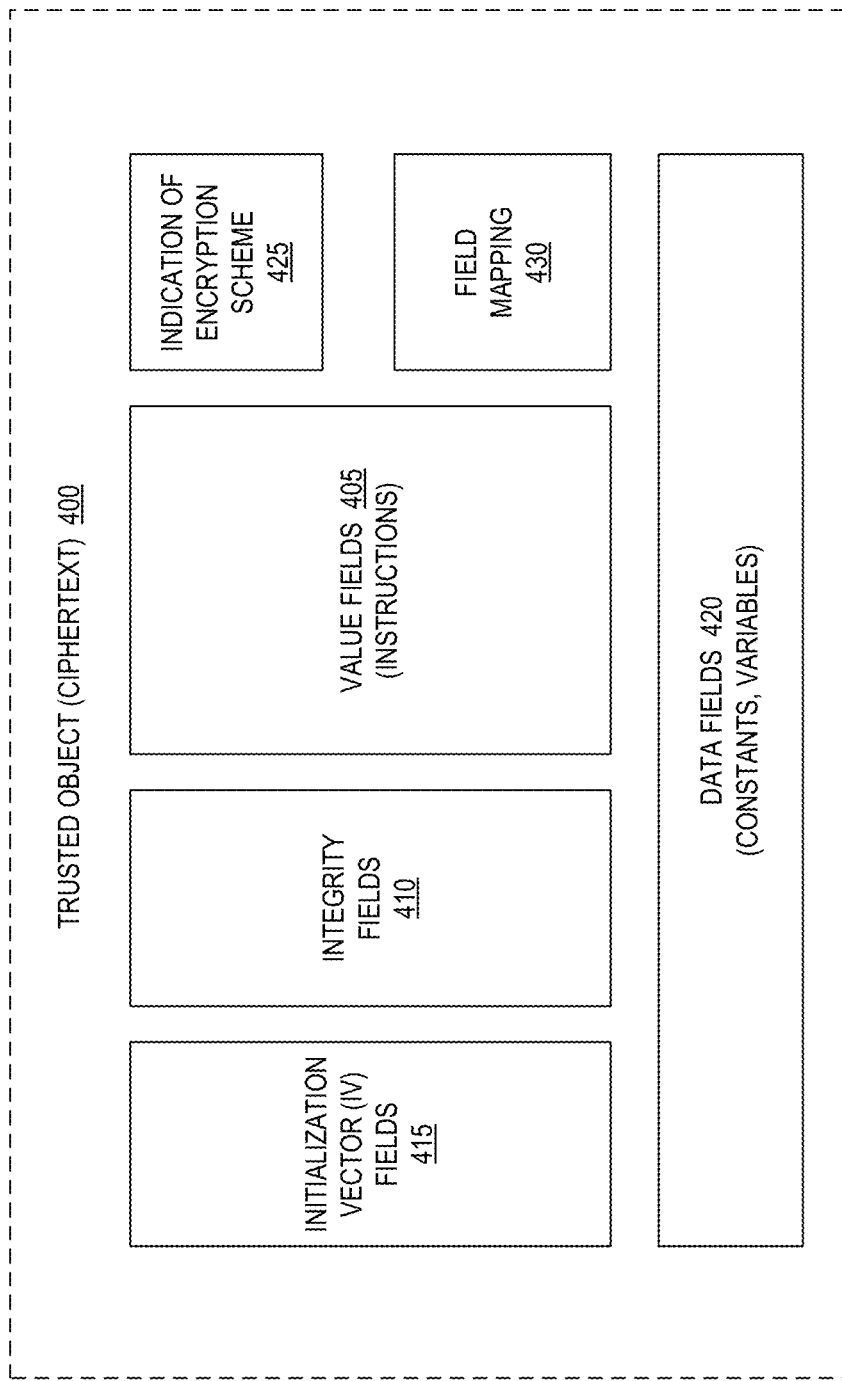
FIG. 4 is a block diagram illustrating elements of a trusted object, in accordance with an embodiment of the invention.

FIG. 4 is a block diagram illustrating elements of a trusted object 400, in accordance with an embodiment of the invention. Trusted object 400 is one possible implementation of trusted objects 205 illustrated in FIG. 2 and represents the ciphertext of the plaintext instructions and associated data of an executable program. The illustrated embodiment of trusted object 400 includes value fields 405, integrity fields 410, initialization vector (IV) fields 415, data fields 420, an indication of encryption scheme 425, and field mapping 430.

Value fields 405 represent memory fields for storing encrypted executable instructions (also referred to as encrypted plaintext instructions). The instructions encrypted within value fields 405 may be encrypted with a variety of different B Series or C Series protection schemes as discussed below. Integrity fields 410 represent memory fields for storing integrity values. In one embodiment, there is a one-to-one correspondence between value fields 405 and integrity fields 410. The integrity values are used as an integrity check to determine whether the contents of their corresponding value fields 405 have been modified, or in some cases, reordered. IV fields 415 store initialization vectors for initializing the decryption algorithms used in stateful encryption schemes. IV fields 415 are not used for some protection schemes, as is discussed below. Data fields 420 store encrypted program data, such as constants and variables. The program data may be protected using different encryption techniques than that applied to the instructions within values fields 405. However, since data is not typically accessed sequentially, the stateful C Series protection (disclosed below) is generally not suitable to protect data fields 420, while the stateless B Series (disclosed below), or other conventional encryption techniques may be used. Indication of encryption scheme 425 is accessed by protection engine 230 to determine which protection scheme and encryption algorithms are used by the instant trusted object to protect its instructions. In some embodiments, the protection scheme and encryption algorithms may be assumed and therefore indication of encryption scheme 425 may be omitted. Field mapping 430 provides a mapping for associating value fields 405 with their corresponding integrity fields 410 and IV fields 415 (when used). Field mapping 430 may be implemented using a variety of techniques including simple offsets and/or pointers. In some embodiments, the mapping may be assumed by protection engine 230 and therefore omitted. In some embodiments, one or more compression techniques may be applied to integrity fields 410 and/or IV fields 415 to reduce the protection/encryption overhead associated with these fields.

As described above, FE is a type of software protection that begins when the software leaves the control of a developer and ends within the Protected Volume of a target processor. FE can be provided by stateless or stateful schemes. The protected program is so protected for the entire time that it is in transit and while it sits in memory, even while it is in execution. The same may be true of all of the data used and generated by the program. Protection is removed from program instructions and data when they are within a Protected Volume (e.g., protected volume 215).

1.0 Scheme Series

FE is implemented on instructions and data via the use of special operations and special memory fields. There are a number of ways to arrange and use those operations and fields. As noted above, an arrangement of translations and XORs (or XNORs) is referred to as an "algorithm." An algorithm and a particular use of fields is referred to as a "scheme." Within this document a name is given to each such scheme as well as to (1) the default arrangement that uses no special operations and has no special fields and (2) the intermediate arrangements that use no special operations but do have special fields. The schemes are grouped into the following three "series": (1) the A series consists of one scheme that is the default format (no protection provided), (2) the B series consists of stateless schemes, and (3) the C series consists of stateful schemes.

The A series consists of one scheme, for the default format. Instructions and data in this scheme are in plaintext; the instructions can run on a general purpose processor. The "geometry" for this scheme (i.e., the number of fields for each value) consists of a Value Field only. The scheme in this series does not use any special operations and has no special fields. As a consequence this scheme implements no protection and thus does not implement FE. The scheme is intended as a reference point for the other schemes.

The B series includes seven schemes, named B0, B1, ..., B6. The digit in each name indicates the number of translations used in the scheme: scheme Bi+1 can be thought of as scheme Bi with an additional translation. In this way scheme Bi+1 "builds on" scheme Bi. Scheme B0, like A, does not implement FE. Its purpose is to provide a stepping stone to the other B series schemes. The geometry for all of the B series schemes is the same and includes two fields: (1) a Value Field that holds either an instruction or data, and (2) an associated Integrity Field.

The C series includes four schemes, named C0, C1, C2, and C3. The C series schemes, like the schemes in the B series, "build on" each other but, unlike the schemes in the B series, they do so by providing "Location Integrity" (discussed in section 3.0 ELEMENTS OF FE PROTECTION) over increasingly larger areas of memory. The C series schemes can all use the same algorithms, but scheme C3 has a memory scheme that more fully implements FE. C0, like A and B0, does not implement FE. Its purpose is to provide a stepping stone to the other C series schemes. The geometry for all of the C series schemes is the same and includes three fields: (1) a Value Field, (2) an associated Integrity Field, and (3) an associated IV Field.

The protection schemes are summarized in TABLE 1 (FIG. 5). The geometry of each scheme and the "builds on" relationships between them are illustrated in FIG. 6. For convenience the Integrity Fields and IV Fields are shown in FIG. 6 to be contiguous with their associated Value (Instruction) Fields. However, this contiguity represents a logical proximity, not necessarily a physical one. In any given implementation the Integrity Field may be physically far afield from its associated Value Field. For convenience, the notations used throughout this document are summarized in TABLE 4 (FIG. 8).

The IV Field is used for removing protection from and applying protection to the Value and Integrity Fields. The IV Field may thus be protected separately from those two fields. In one embodiment, conventional protection/encryption techniques are used to protect and securely transmit the IV values/fields. The IV Field is retrieved into the Protected Volume prior to removing/applying protection to the Value and Integrity Fields.

2.0 Value Types & Notation

In this section we present the relationship between "value" and the following items: (1) memory types, (2) access patterns, (3) protection types, and (4) replay protection. For our purposes there are three types of "values": (1) instructions, (2) constants, and (3) variables, where the union of constants and variables is the set called "data." There are two types of memory: (1) read-only and (2) writable. And there are two types of access patterns: (1) sequential and (2) random.

All of the information in memory consists of "values." The universe of values is partitioned into instructions and "data." And data is further partitioned into "constants"—values that can be stored in read-only memory—and "variables"—values stored in writable memory and which includes the stack and the heap.

Instructions, like constants, may be stored in read-only memory. The access pattern for instructions is sequential. That is, we presume that if the current instruction is at address j, then the next instruction will be at address j+1. The access pattern for data—both constants and variables—is typically random. Stateless protection can be used for either access pattern. Stateful protection can also be used for either access pattern also, but the associated protection overhead practically constrains it to be used with the sequential access pattern.

Writable memory is subject to replay attacks since the value stored in any given location can change over the lifetime of the program. Read-only memory, on the other hand, is not subject to such attacks. The details presented above are summarized in TABLE 2, while TABLE 3 is a transposition of TABLE 2 (see FIG. 7).

In this patent application we presume an ECB implementation of a substitution cipher for a translation function, T. For example, let the key, k, be 64 bits, consisting of 16 nibbles (each of which is 4 bits). Number the nibbles in k from 0 through 15 inclusive. If the $0^{th}$ nibble of the input is for example 7, then the $0^{th}$ nibble of the output is the value of the $7^{th}$ nibble of the key. If the $1^{st}$ nibble of the input is for example 3, then the $1^{st}$ nibble of the output is the value of the $3^{rd}$ nibble of the key. And so on for each nibble of the input. Thus, the 16 nibbles of k form a "translation table" for conversion of each input nibble into the corresponding output nibble and hence the name of this function. Note that this implementation of T is a bijection if and only if the key is invertible. If the key is non-invertible, then it is possible that T is neither injective nor surjective. Other implementations of T are possible, of course, such as DES and AES. However, for simplicity of discussion, the ECB implementation of a substitution cipher is assumed herein.

The notations used throughout this document are summarized in TABLE 4 (FIG. 8) for convenience.

3.0 Elements of FE Protection

FE may include the following three types of protection: (1) Privacy, (2) Value Integrity, and (3) Location Integrity. "Privacy" means that an adversary cannot determine the plaintext bits that comprise either a program (i.e., a sequence of instructions) or its associated data. Privacy implies encryption of some kind. "Value Integrity" means that the processor can determine the integrity of a value. That is, the processor can detect tampering of values during the time that values are outside of a Protected Volume. Value Integrity implies that there is an additional field in memory, called the "Integrity Field," associated with each storage location and that the contents of the Integrity Field are a cryptographic function of the value stored at that location. The processor can use that additional field to determine the integrity of the value. "Location Integrity" means that an adversary cannot undetectably move any part of a program or its data either within the program (or its data space) or between programs (and their data spaces). This also means that the adversary cannot undetectably move parts of a program to a data space or vice versa. Location Integrity implies that each value is either directly associated with an address or else with another value that is recursively associated with an address.

4.0 No Protection: the A Series

The A series provides no inherent protection and is included in this nomenclature only for comparison with the schemes that do. There are no algorithms or schemes for this series. This section is included for the sake of completeness.

5.0 Stateless Protection: the B Series

Stateless protection, comprising the B series of schemes, implements FE by the use of: (1) a translation function, (2) an Integrity Field, and (3) "address anchoring." In this section, the geometry, address anchoring, and algorithms, for the B series of schemes are described.

5.1 Geometry

Two fields are assumed for the B series schemes: (1) Value Field, and (2) Integrity Field. The Value Field holds a value—either an instruction or data (see TABLE 2, FIG. 7). The Integrity Field holds integrity information for the value.

5.2 Address Anchoring

Address anchoring provides Location Integrity by binding a value to an address. Address anchoring may be implemented by XORing (or other logic functions such as XNORing) the Integrity Field with a possibly encrypted form of the address. Let "programs" include for the nonce both instructions and data. With address anchoring, if two programs use different keys, then the adversary is unable to swap two values between the two programs undetectably, even if the adversary swaps the associated Integrity Fields as well, even if the values are identical and are at the same address in each program, because the keys are different. That is, address anchoring provides Location Integrity.

If the Integrity Field is anchored to the address, and if the Integrity Field is a function of the Value Field, then this mechanism implicitly anchors the Value Field as well. However Privacy may still need to be provided for the Value Field. One approach for providing Privacy is to use a translation function. That is, use "e(s)" for the Value Field. Unfortunately, this may be inadequate for instructions. Since the translation function operates in ECB mode, e(s) enables the adversary to use frequency analysis to determine s and then e (and d), thereby breaking the privacy protection. The value should thus be provided with additional protection. One approach is to address anchor the Value Field. The result is that both the Integrity Field and the Value Field are explicitly anchored but for different reasons—the former for Location Integrity; the latter for Privacy. For simplicity of implementation the same algorithm is used in the stateless schemes for both instructions and data, though some embodiments may use different protection algorithms for instructions versus data.

Address anchoring suggests that the address used to remove protection be the same as the address that was used to apply protection. When protection is applied, which occurs at compile time, the Protection Engine uses the logical address (i.e., the address as viewed by the program, where the first address is usually zero) for each value. When protection is removed, which occurs at run time, the Protection Engine is given a physical address (i.e., the address as viewed by the hardware). The Protection Engine uses the physical address to specify to memory the set of bits to fetch. But when the bits arrive, the Protection Engine removes protection from them, and for this step, the Protection Engine uses the logical address, the address used when protection was applied. The determination of the logical address depends on the organization of the memory of the particular platform in use, namely on the use of pages and segments. There are four cases, as shown in TABLE 5 (FIG. 7).

In case 1, memory is neither paged nor segmented and as a consequence the logical and physical addresses are the same. In this case the address at which the code is loaded (i.e., the physical address) is the relocated address (i.e., the base address of the code). Memory on early Cray computers, for example, was of this type.

In the other three cases the logical address is different from the physical address. In cases 2 and 3 memory is paged, possibly with segments, and as a consequence the logical address can be computed by the expression (P*S)+D, where P is the page number (starting at zero) of the program or segment, S is the page size, and D is the offset within the page. In case 4, memory uses segments without pages; as a consequence the logical address is the offset within the segment.

In cases 2, 3, and 4, the Protection Engine obtains from the target processor information in addition to the physical address, namely either the logical address itself or the values that will enable the Protection Engine to compute the logical address. The provision of this additional data by the target processor breaks the transparency of the Protection Engine.

Note that in case 1 the adversary can learn the logical address: it is the physical address sent to memory outside of the Protected Volume. However, for cases 2 through 4, the adversary cannot find out the logical address since (1) it differs from the physical address and (2) the adversary does not have access to the data within the Protected Volume that the processor sends to the Protection Engine that enables Protection Engine to determine the logical address. In this document, the conservative stand is taken, and case 1 assumed.

Some of the algorithms for the C series of schemes (described below), use address anchoring; other C series algorithms provide Location Integrity based on an instruction's place in a sequence of instructions—that is, they use "chaining."

5.3 Stateless Algorithms

In this section the algorithms for the B series of schemes are constructed using the translation function and the XOR operation (or other logical operations such as XNOR). The algorithms are constructed based on the number of translations they use. The minimum number of translations is one, the maximum used herein is six, which correspond to Algorithm 1 and Algorithm 6, respectively. One of the considerations in the design of these schemes is to minimize the computational overhead required to perform the translations as instructions and data are being fetched (and, in the case of data, stored). The purpose of the "incremental" exploration here of these algorithms is to provide the minimum acceptable protection for an application while incurring the least computational overhead, thus maximizing the instruction processing rate.

The following discussion presents the application of protection, not its removal. The process for removing protection is presented in TABLE 8 (FIG. 10).

Below it is shown that Algorithm 1 uses one XOR operation for each value and Algorithms 2-6 use two XOR operations. Algorithms 1 and 3-6 use at least three parallel steps; Algorithm 2 uses at least two parallel steps. In all of the algorithms in this section key $k_1$ is invertible—otherwise we cannot recover the plaintext contents of the value—and in Algorithms 5 and 6 key $k_5$ also is invertible for the same reason. All the other keys—i.e., $k_2$, $k_3$, $k_4$, and $k_6$—may be non-invertible.

Recall from the discussion in Section 5.2 that the Integrity Field is a function of the Value Field and that both the Value and the Integrity Fields are address anchored. This means that both fields are a function of both the value and the address.

Algorithm 1 uses one translation. Algorithm 1 is created by building on B0 (no protection) with the addition of one translation:

Value Field: $k_1(v \oplus a)$; Integrity Field: $k_1(v \oplus a)$ (Algorithm 1)

In order to limit Algorithm 1 to one translation, the Integrity Field is assumed to be a copy of the Value Field (as opposed to the Integrity Field being computed independently of the Value Field). As a result, for this algorithm, the Integrity Field is superfluous—a "don't care" field—providing only a rudimentary form of Value Integrity.

Before moving on to Algorithm 2, the possibilities for an Integrity Field within the set of algorithms that have exactly one translation is explored. An Identity Field is constructed that is different from the Value Field in two ways, but, as will be shown, neither way is satisfactory. The first way is to XOR the Integrity Field with the address, as shown in Algorithm 1a:

Value Field: $k_1(v \oplus a)$; Integrity Field: $a \oplus (k_1(v \oplus a))$. (Algorithm 1a)

The adversary is assumed to know the address, so this algorithm provides no increase in Value Integrity over Algorithm 1. Another way to construct an Integrity Field with only one translation is to use the value, as shown in Algorithm 1b:

Value Field: $k_1(v \oplus a)$; Integrity Field: $v \oplus (k_1(v \oplus a))$. (Algorithm 1b)

But this has the effect of eliminating Privacy since it enables the adversary to obtain v with one XOR operation:

Value Field $\oplus$ Integrity Field $= (k_1(v \oplus a)) \oplus (v \oplus (k_1(v \oplus a))) = v$ An alternative to Algorithm 1 is to apply the XOR operation as the last step in the algorithm instead of the first:

Value Field: $v \oplus k_1(a)$; Integrity Field: $v \oplus k_1(a)$ (Algorithm 1c)

Value Field: $k_1(v) \oplus a$; Integrity Field: $k_1(v) \oplus a$ (Algorithm 1d)

However, this is weak since this would allow the adversary to exploit re-use. In the case of Algorithm 1c, the adversary can use frequency analysis on v to isolate $k_1(a)$. Since the adversary knows the address, a, he can then easily determine $k_1$. In the case of Algorithm 1d, the adversary can eliminate "a" by an XOR—this provides no Location Integrity.

Algorithm 2 allows two translations. Algorithm 2 is created by building on Algorithm 1 with the addition of a second translation. This second translation allows Algorithm 2 to make meaningful use of the Integrity Field:

Value Field: $k_1(v \oplus a)$; Integrity Field: $k_2(v \oplus a)$ (Algorithm 2)

As noted above, $k_1$ is invertible (to recover the value) but $k_2$ need not be invertible, since, when it comes time to check the Value Integrity, the Integrity Field can be recalculated and matched, rather than inverted (decrypted).

Algorithm 3 allows three translations. Algorithm 3 is created by building on Algorithm 2 with the addition of a third translation. One of Algorithm 2's weaknesses is its reuse of the input ($v \oplus a$). Another weakness is its use of only two keys. There are four choices of where to apply the third translation: to either the value or the address argument in either the Value or the Integrity Field. The address argument needs protection more than the value argument since the adversary knows the address but not the value. And the Value Field needs protection more than the Integrity Field since $k_1$ is an invertible key and invertible keys are weaker than non-invertible keys (based on keyspace size). So the third translation is applied to the address argument in the Value Field to arrive at Algorithm 3:

Value Field: $k_1(v \oplus k_3(a))$; Integrity Field: $k_2(v \oplus a)$ (Algorithm 3)

Note that in Algorithm 3 (as in all of the algorithms presented in this section) $k_1$ is invertible, but both $k_2$ and $k_3$ may be non-invertible.

Algorithm 4 allows four translations. Algorithm 4 is created by building on Algorithm 3 with the addition of a fourth translation. Using the same reasoning used in deciding where to place the third translation in Algorithm 3, a desirable place to apply the fourth translation is to the address argument of the Integrity Field:

Value Field: $k_1(v \oplus k_3(a))$; Integrity Field: $k_2(v \oplus k_4(a))$ (Algorithm 4)

Algorithm 5 allows five translations. Algorithm 5 is created by building on Algorithm 4 with the addition of a fifth translation. The fifth translation may be added to the value argument in either the Value Field or the Integrity Field. The weakest part of Algorithm 4 is the Value Field since $k_1$ is invertible (and translations are already applied to both address arguments). So the fifth translation is added to the value argument in the Value Field:

Value Field: $k_1(k_5(v) \oplus k_3(a))$; Integrity Field: $k_2(v \oplus k_4(a))$ (Algorithm 5)

Algorithm 6 allows six translations. Algorithm 6 is created by building on Algorithm 5 with the addition of a translation in the only remaining place, to the value argument in the Value Field:

Value Field: $k_1(k_5(v) \oplus k_3(a))$; Integrity Field: $k_2(k_6(v) \oplus k_4(a))$ (Algorithm 6)

Since $k_x(k_y(v))$ can be reduced to $k_z(y)$ for all x and y, there is no gain in strength in algorithms that allow more than six translations. In addition there is no gain in strength in algorithms that use more than two XOR operations (or other logic operations such as XNOR) for any of the algorithms.

Algorithms 1 through 6 presented above are summarized in TABLE 6 (FIG. 9). The Algorithms presented in this section provide Privacy by the use of the translation function. Algorithm 1 does not provide for explicit Value or Location Integrity. The other algorithms all provide Value Integrity by the use of a separate Integrity Field, the contents of which are a function of the Value Field, and they provide Location Integrity via address anchoring.

5.4 Stateless B Series Schemes

In this section the stateless schemes are identified. Scheme Bi uses Algorithm i, for $1 \leq i \leq 6$, as described above. This section converts the generic keys such as "$k_1$" used in the description of the algorithms into specific key types such as "e" and "f" (see Table 4, FIG. 8).

For each algorithm a set of specific keys defines a scheme. Each such set of chosen keys is called a "configuration" and is uniquely described by an ordered tuple of keys. For example the configuration for Algorithm 2 as shown in Table 6 (FIG. 9) is $<k_1 k_2>$. In one embodiment, it is assumed that each scheme has available to it the number of keys that would make that algorithm the strongest it can be.

The configurations for schemes B1 through B6 are <e>, <ef>, <egf>, <egfh>, <ecgfh>, and <ecgfih>, respectively, as shown in Table 7 (FIG. 9). The removal of protection, which includes an integrity check, for the B Series Schemes, as shown in Table 7, is depicted in Table 8 (FIG. 10). It is presumed that B6 is stronger than B5 which in turn is stronger than B4, and so on down to B1.

As an aside, it is possible to develop schemes for Algorithms 2 through 6 using only one invertible key and its inverse. To maximize strength, the same key is not applied to the same argument within a given scheme, as shown in Table 9 (FIG. 10). In order to distinguish these schemes from schemes B0 through B6 shown above, a prime is added to the name of each of these schemes. Additional schemes can be defined that use more than one key but fewer than the number shown in Table 7. These schemes are not enumerated under the presumption that those in Table 7 are sufficient.

6.0 Stateful Protection: the C Series

Stateful protection, comprising the C series of schemes, provides protection by linking instructions together via "state" as explained below.

6.1 Geometry

The C series schemes use three fields: (1) Instruction Field, (2) Integrity Field, and (3) Initialization Vector (IV). The Instruction Field holds the instruction. Since stateful protection applies to the sequential access pattern only (see Table 2, FIG. 7), the name of the first field in the C series schemes is "Instruction," not "Value," meaning that neither data nor addresses appear in this field. The Integrity Field holds integrity information for the instruction. The IV Field holds an initialization vector. The IV is a key so it should be encrypted whenever it is outside of a Protected Volume.

6.2 Stateful Algorithms

Before presenting the algorithms for the C series of schemes, the keys that these schemes use are first described. Recall from Table 4 (FIG. 8) that a key is a data item that is unavailable to the adversary. When a key is outside of a Protected Volume, it is presumed to be encrypted or otherwise protected. For the C series of schemes three keys are used, the first and last of which may actually be sets of keys:

(1) The first key consists of all of the IV Fields that have IV values. As is explained below, the C1 scheme uses an IV Field for each instruction. However the C2 and C3 schemes use an IV for only a portion of the instructions: that information for these schemes may conveniently be condensed into <address, IV> pairs.

(2) The second key is an encryption key, e.

(3) The third key is at least one non-invertible key, $f$, used for the Integrity Field. Algorithms 9-13 are shown using additional keys such as g, h, and i (see Table 4).

The C1 and C2 schemes provide implementation steps toward C3, each providing Location Integrity over an increasingly larger area of memory until C3, which provides it over an entire program.

Figure 11:
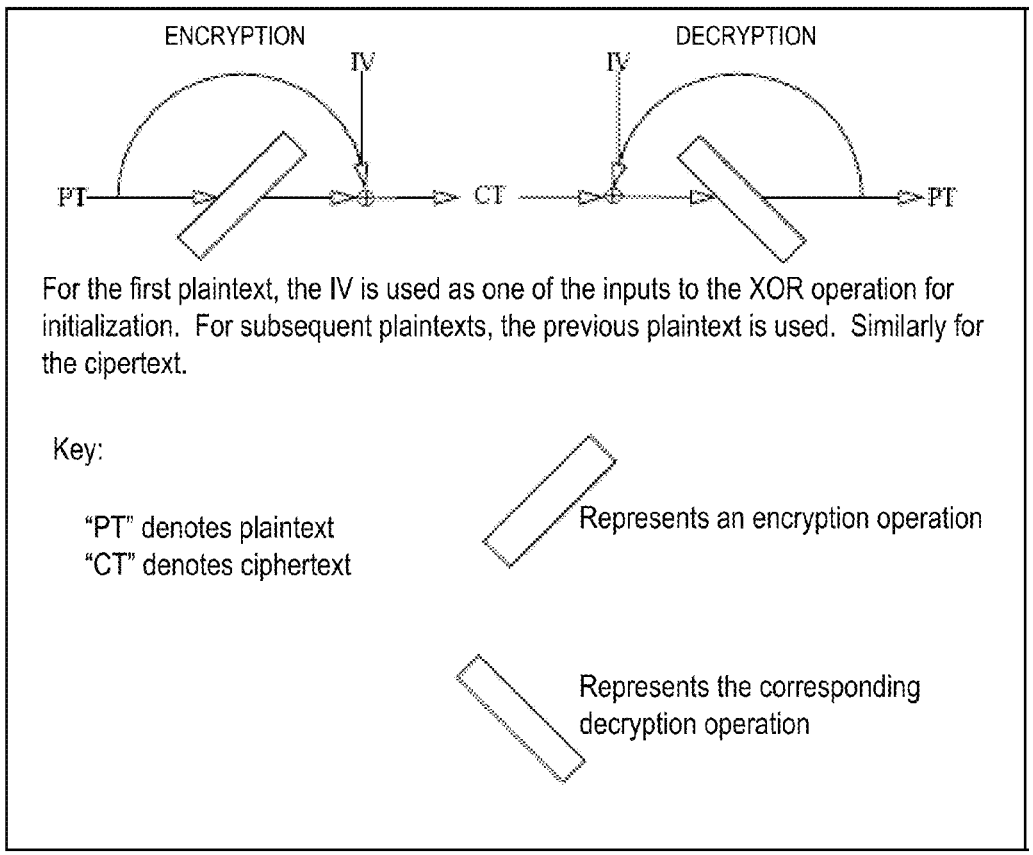
FIG. 11 is a diagram graphically illustrating stateful encryption/decryption algorithms, in accordance with embodiments of the invention.

The basis for FE in the stateful schemes is "chaining," which is the cryptographic association of one instruction $P_i$ with some other instruction $P_j$, which in turn is associated with yet another instruction $P_k$ to form a chain of instructions where normally i=j−1 and j=k−1. The cryptographic mode used as the basis for the association between instructions is Plaintext Block Chaining ("PBC") and is shown diagrammatically in FIG. 11 and algebraically in Table 10 (FIG. 12). Note that the first encryption/decryption in the sequence, since it has no predecessor, uses an IV value. It is also noted that the encryption portion of Algorithm 7 uses one translation and one XOR operation (or other logical operation such as XNOR) in at least two parallel steps for each value.

PBC mode provides Privacy by the use of the translation function. The PBC mode provides location integrity by chaining one instruction to its lexically succeeding instruction. As long as the first instruction in the sequence is at the correct address, Location Integrity is provided. The IV for the decryption of a given sequence is the same as the IV used when the sequence was encrypted. Unlike stateless protection algorithms, there is no address explicitly included in PBC. Unfortunately, the PBC mode by itself provides only a weak form of Value Integrity. Because PBC does not self-synchronize, an error in a given ciphertext input continues to propagate to subsequent inputs, corrupting all subsequent outputs (for this reason PBC is not a good candidate for use in communication channels). A single violation of integrity will cause PBC to generate random instructions, sending the computation off the rails. It cannot be predicted in an off-the-rails situation when (or even if) PBC will generate an illegal instruction that will halt the program, but it can be predicted with certainty that PBC will never right itself and get the program back on track. However for high-consequence applications even stronger control is needed. For those applications the processor should halt with certainty on the bad instruction itself, not possibly halt and not later on. For this purpose the implementation of PBC mode is augmented with an Integrity Field.

The Integrity Field is a function of the instruction itself. Re-use of either the plaintext or ciphertext instruction is avoided, since re-use is weak cryptographically. The Integrity Field should thus use an otherwise-unused translation of the plaintext instruction. One way to implement PBC with an Integrity Field is to combine the Integrity Field with the Instruction Field, folding both into the same chain. That is, the chain of state is formed by interleaving the sequence of Instruction Fields with their associated Integrity Fields, as shown in Algorithm 8, which, for ease of reference, is named "Combined Chain," in Table 11 (FIG. 12).

Note the use of $f(P_0)$ as the argument for the second term in the Integrity Field. The translation prevents re-use of $P_0$. When removing protection, $P_0$ is not simply extracted from $f(P_0)$ because f is non-invertible. Note also that the application-of-protection-portion of Algorithm 8 uses three translations and two XOR operations (or other logical operations) in at least three parallel steps for each value.

The alternative to the "combined" chain approach shown in Table 11 is a "separate" chain approach in which the Integrity Field is not included in the combined chain. The possibilities for this approach are explored in Algorithms 9 through 13. In each case, the Instruction Chain uses PBC mode, as in Algorithm 7 shown in Table 7. The variation in the algorithms is in the handling of the Integrity Fields.

In the separate chain approach there are two chains, the Instruction Chain and the Integrity Chain. If one imagines these two chains hanging vertically, then each link in each chain is connected to its vertically adjacent links in that chain. The problem that needs to be solved is providing a connection horizontally between the chains. Each link in an Integrity Chain should have some connection—direct or indirect—with the link in the Instruction Chain corresponding to the associated instruction. If there is no such connection, then the Integrity Chain is of little or no value.

The Integrity Chain uses the value of its associated instruction as an argument. In this way the horizontal linkage is provided. Granted, this allows the adversary to swap two chains without detection, but only if the instruction sequences (and the keys used to provide the protection) are identical, and both sequences start at the same address, in which case the adversary has gained no ground.

A technique for providing additional horizontal linkage is to use the address of the associated instruction in the Integrity Chain. This technique has been previously introduced as "address anchoring." If address anchoring is used, then algorithms with "unchained" Integrity Fields (see Algorithms 12 and 13 below) can be considered.

Algorithm 9, "Two Chains," illustrated in Table 12, uses the instruction value to provide the horizontal connection and does not use address anchoring. The other four algorithms presented in this section, Algorithms 10 through 13, use address anchoring to provide additional horizontal connection.

Algorithm 9 uses two separate chains: one for instructions and the other for integrity values. Horizontal connections between links in the two chains are made by the shared use of the instruction. The first element of the Integrity Chain translates the IV instead of using it raw, so to speak, in order to avoid re-use. And note that the second element of the $i^{th}$ link in the Integrity Chain is different than the first element of the $i+1^{st}$ link, again to avoid re-use. Algorithm 9 requires three translations and two XOR operations (or other logical operations) in at least two parallel steps for each value.

The remainder of the algorithms in this section use address anchoring in the Integrity Chain or Field, depending upon the algorithm. If the Integrity Fields are anchored in Algorithm 9, we arrive at Algorithm 10, "Anchored Chain," shown in Table 13 (the "Chain" in the title of the algorithm refers to the Integrity Chain). Note that there are two independent chains in Algorithm 10, just as there were in Algorithm 9—one for instructions and the other for integrity values. Like Algorithm 9, the first element of the Integrity Chain in Algorithm 10 translates the IV to avoid re-use. Algorithm 10 uses three translations (except for the first value which requires four) and three XOR operations in at least four parallel steps for each value.

If the maximum reasonable translations are applied to Algorithm 10, then Algorithm 11, "Anchored Chain (Maximized)" is obtained, shown in Table 14 (FIG. 14). Algorithm 11 uses five translations (six for the first element in a chain) and three XOR operations (or other logical operations) in at least five parallel steps for each value.

If the constraint for the Integrity Fields to be chained is removed, we arrive at Algorithm 12, "Anchored Fields," so named since the Integrity Fields are address anchored but do not form a chain, shown in Table 15 (FIG. 15). Note that the Integrity Fields in Algorithm 12 do not form a chain. Algorithm 12 uses two translations and two XOR operations (or other logical operations) in at least two parallel steps for each value.

If all reasonable translations are applied to Algorithm 12, we arrive at Algorithm 13, "Anchored Fields (Maximized)," shown in Table 16 (FIG. 15). Algorithm 13 uses four translations and two XOR operations (or other operations) in at least three parallel steps for each value.

The Algorithms for stateful protection are summarized in Table 17 (FIG. 16). The computation requirements for the stateful algorithms are shown in Table 18 (FIG. 17). In the presentation of the C Series Schemes, we could use any of Algorithms 8 through 13. For uniformity the Tables in Section 6.4 below all use the same algorithm—Algorithm 8, "Combined Chain."

6.3 IV Types

In this Section the three types of initialization vectors (IVs) used by the C series schemes are described: (1) instruction IV, (2) block IV, and (3) jump IV. All three IV types are of the same form and all are stored in an IV Field inside a Protected Volume. The types differ in three respects: (1) the nature of the associated instruction, (2) the instruction that uses the IV, (3) whether duplicate IV values in the same program are either discouraged or required.

An "instruction IV" may be specified for any instruction. The instruction IV is used to help decode and verify the associated instruction. Duplicate IV values in the same program are discouraged. A "block IV" is just like an instruction IV except that a block IV may be specified only for the first instruction in a block. A "block" is a sequence of instructions for which both of the following two conditions hold: (1) no instruction in the sequence is the target of a jump except possibly the first instruction, and (2) there is no jump instruction in the sequence except possibly the last instruction. That is, blocks are defined such that (a) jump targets, if any, are at the beginning of a block and (b) jump instructions, if any, are at the end of a block. A "jump IV" may be specified only for a jump instruction. The jump IV is used by the target of the associated instruction. Duplicate IV values in the same program are required for multiple jump instructions with the same target since the jump instruction must have the same IV, regardless of the origin of the jump. The jump IV for different targets in the same program should be different. The C1 scheme uses instruction IVs, one for each instruction. The C2 scheme uses block IVs, one for each block. The C3 scheme uses one block IV (for the first block) and multiple jump IVs, one value for each jump target. In all cases, IV fields should be stored within a Protected Volume, safe from the adversary. The characteristics of the three IV types are summarized in Table 19 (FIG. 17).

6.4 Stateful C Series Schemes

As noted above, all of the diagrams in this section are shown using Algorithm 8, "Combined Chain." The diagrams in this section show the formulas for applying protection only, while the formulas for removing protection are shown in Table 11.

6.4.1 C1 Bit-Chaining Stageful (BiCF)

Scheme C1 uses only instruction IVs. There is an instruction IV for every instruction. As a conceptual aide and to provide a foundation for the "instruction-chaining" and "block-chaining" terms introduced below, this scheme can be considered to perform "bit-chaining," that is, to chain the bits of an instruction together. However, this description is inaccurate since each link of the chain consists of an entire instruction. If the name bit-chaining were accurate, then each link of the chain would consist of a single bit: the first bit would be encrypted and then XORed with an IV consisting of a single bit, then the second bit would be encrypted and subsequently XORed with the plaintext for that first bit, and so on.

This scheme does not protect against instruction-swapping (i.e., swapping two instructions along with their corresponding IV and Integrity Fields) (see C2 for that) nor block-swapping (i.e., swapping two entire blocks along with their corresponding IV and Integrity Fields) (see C3 for that).

Note that C1, unlike C2 and C3, can be appropriately used for data (i.e., for a random memory-access pattern), since C1 does not connect adjacent memory locations via state. C1 is thus actually a stateless scheme, with a separate key (the IV) for each value field, even though the way it is presented gives it the appearance of a stateful scheme. This is acceptable since the purpose of C1 is to serve as a stepping stone to C2 and then on to C3, both of which are truly stateful schemes.

A fragment of the beginning of a program in the C1 format is shown diagrammatically in Table 20 (FIG. 18). For each instruction in C1, the Protection Engine uses as the IV for the current instruction the IV Field for that instruction, as described below.

When a program in C1 executes, the Protection Engine recovers the $i^{th}$ plaintext, $P_i$, as follows:

$$P_i = d(VF_i \oplus iv_i),$$

where
$VF_i$ represents the contents of the Value Field for address i, which in Table 20 is labelled as the Instruction Field,
and
$iv_i$ represents the contents of the IV Field for address i.

The Protection Engine confirms integrity by re-computing the Integrity Field, given the plaintext for the instruction, and comparing it with the Integrity Field. The use of the IV fields and the IV register, introduced below, for the C series schemes is summarized in Table 23 (FIG. 20).

6.4.2 C2 Instruction-Chaining Stateful (ICF)

Scheme C2 uses block IVs. There is one block IV for each block. This scheme chains together instructions, hence the name. This scheme protects against both bit—and instruction—swapping but not against block-swapping (see C3 for that).

A fragment of the beginning of a program in the C2 format is shown diagrammatically in Table 21 (FIG. 18), which shows the beginning of two blocks, one starting at address 0 and a second starting at address 50. Note that the IV Field holds a value only for the first instruction of each block.

This scheme and the next both use a register (e.g., IV register 250 in FIG. 2) to hold an IV. This scheme and the next differ in their use of an instruction's IV field: this scheme, the C2 scheme, uses it to find the IV for the current instruction; the next scheme, the C3 scheme, uses it to find the IV for the next instruction.

In the C2 scheme the Protection Engine uses as IVs all IV fields that are non-zero. If an instruction's IV field is zero, the Protection Engine uses the IV register instead. At end of each instruction's execution, the Protection Engine sets the IV register with a freshly-computed value that will be used as the IV (i.e., for the first element of the formula for the Instruction Field for the next instruction), if the IV field for that next instruction is zero. If this freshly-computed value is also zero, the Protection Engine should halt on a bad IV. Note, the IV field for the first instruction of a program should be non-zero.

When a program using C2 executes, the Protection Engine recovers the $i^{th}$ plaintext, $P_i$, as follows:

$$P_i = d(VF_i \oplus iv)$$

where
$VF_i$ represents the contents of the $i^{th}$ Value Field, which in Table is the Instruction Field,
and
iv represents the $i^{th}$ instruction's IV field if that field is non-zero; otherwise iv represents the current value of the IV register.

The Protection Engine confirms integrity by re-computing the Integrity Field, given the plaintext for the instruction, and comparing it with the Integrity Field. The use of the IV fields and the IV register for the C series schemes is summarized in Table 23.

6.4.3 C3 Block-Chaining Stateful (BLCF)

Scheme C3 uses one block IV (for the first block) and possibly multiple jump IVs (one value for each jump target). For example, if addresses 20 and 80 of a given program both jump to the block beginning at address 50, then in the C3 format the plaintext value of the IV Field for addresses 20 and 80 is the same and is the IV used by instruction 50. Recall that IVs are considered "cryptovariables" or "critical variables" and are thus encrypted when outside of a Protected Volume.

This scheme chains blocks together, hence the name. This scheme protects against bit-, instruction-, and block-swapping.

A fragment of the beginning of a program in the C3 format is shown diagrammatically in Table 22 which shows (1) the beginning of two blocks, one starting at address 0 and a second starting at address 50, and (2) two jump instructions, one at address 20 and a second at address 80, both of which jump to address 50.

As noted above, the C2 and C3 schemes both use a register to hold an IV. However the two schemes differ in their use of an instruction's IV field: the C2 scheme uses it to find the IV for the current instruction; the C3 scheme uses it to find the IV for the next instruction.

In this scheme, C3, the IV for the current instruction is always in the IV register. At the end of each instruction's execution, the Protection Engine sets the IV register with the freshly-computed IV, if the IV field is zero; otherwise, it sets the IV register with the IV field. Note that the IV for the first instruction of a program must be in the IV register prior to execution. If <address, IV> pairs are used to specify IVs, then an out-of-range address such as −1 could be used for the address for this initial IV.

When a program using C3 executes, the Protection Engine recovers the $i^{th}$ plaintext, $P_i$, as follows:

$$P_i = d(VF_i \oplus ivr)$$

where $VF_i$ represents the contents of the $i^{th}$ Value Field, which in Table is the Instruction Field, and ivr represents the value of the IV register.

The Protection Engine confirms integrity be re-computing the Integrity Field, given the plaintext for the instruction, and comparing it with the Integrity Field. The use of the IV fields and the IV register for the C Series Schemes is summarized in Table 23 (FIG. 20). The items chained and the swapping protection afforded by the three C series schemes is shown in Table 24 (FIG. 20).

7.0 Methods of Operation

Figure 21:
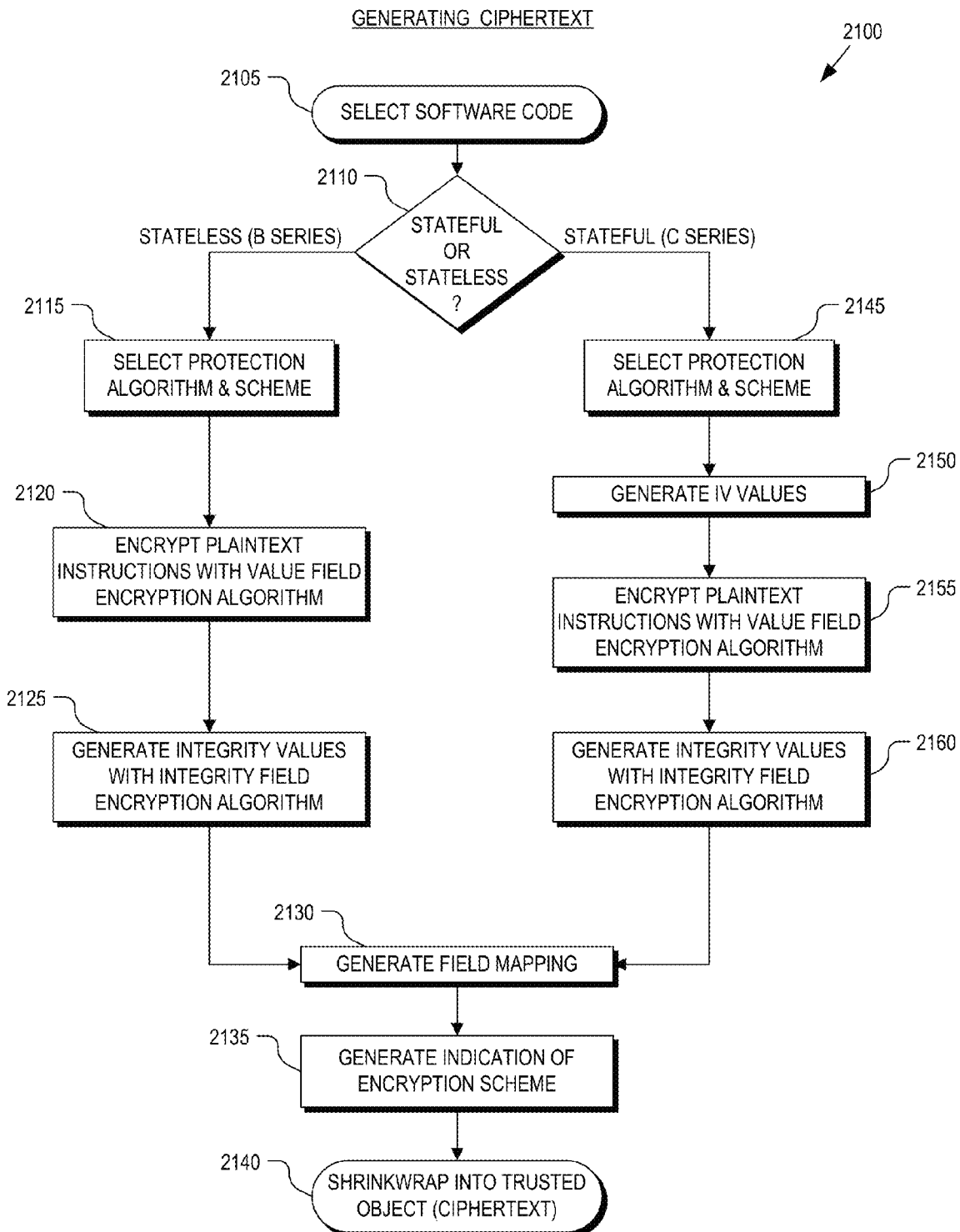
FIG. 21 is a flow chart illustrating a process for generating ciphertext, in accordance with embodiments of the invention.

FIG. 21 is a flow chart illustrating a process 2100 for generating ciphertext, in accordance with embodiments of the invention. Process 2100 may be implemented by protected volume 210 to generate ciphertext, such as trusted objects 205, or by protection engine 230 when storing a program to system memory 225. The order in which some or all of the process blocks appear in process 2100 should not be deemed limiting. Rather, one of ordinary skill in the art having the benefit of the present disclosure will understand that some of the process blocks may be executed in a variety of orders not illustrated.

In a process block 2105, software code to which protection is to be applied is selected. In a decision block 2110, the stateless or stateful encryption type is selected. As mentioned above, stateless encryption may be applied to both sequential values (e.g., instructions) and non-sequential values (e.g., data), while stateful is best suited for sequential values.

If stateless protection is selected, then process 2100 continues to a process block 2115. In process block 2115, the stateless encryption algorithm and scheme are selected (e.g., Algorithms 1 through 6 summarized in Table 6 and B Series Schemes B1-B6 summarized in Table 7). Once the protection algorithm and scheme are selected, the encryption of the software code can commence. In a process block 2120, the protection algorithm is applied to each value to generate encrypted values for insertion into the value fields. In the case of instructions, each plaintext instruction is encrypted and inserted into a value field (e.g., value fields 405) of the ciphertext. In a process block 2125, an integrity value is generated for each value field. The integrity value may be a function of its corresponding plaintext instruct or a function of its corresponding plaintext instruction and its corresponding memory location or address (if address anchoring is applied). Once generated, each integrity value is inserted into an integrity field (e.g., integrity fields 410) of the ciphertext.

In a process block 2130, a field mapping (e.g., field mapping 430) is optionally generated. The field mapping enables the decryptor or protection engine to map value fields to their corresponding integrity fields during removal of protection. In embodiments where the field mapping is assumed, creation of the field mapping may be omitted. In some embodiment, the field mapping may also be encrypted using techniques described herein or other conventional techniques. In some embodiments, the field mapping is not encrypted.

In a process block 2135, an indication of the encryption scheme (e.g., indication of encryption scheme 425) is generated and appended to the ciphertext. In embodiments where the encryption scheme is assumed, creation of the indication may be omitted.

Finally, in process block 2140, the various fields are shrink-wrapped into a single ciphertext entity (e.g., trusted object 400) for distribution or communication outside of a trusted volume. Shrink-wrapping may include compressing or otherwise bundling the various fields for collective distribution outside a trusted volume.

Returning to decision block 2110, if stateful protection is selected, then process 2100 continues to a process block 2145. In process block 2145, the stateful encryption algorithm and scheme are selected (e.g., Algorithms 7 through 13 summarized in Table 17 and C Series Schemes C1-C3 summarized in Table 23). Once the protection algorithm and scheme are selected, the encryption of the software code can commence. In a process block 2150, IV values are generated. The IV values may include instruction IV values, block IV values, and/or jump IV values, as discussed above. Once generated, the IV values are inserted into IV fields of the ciphertext (e.g., IV fields 415). Furthermore, it should be noted that there is not necessarily a one-to-one correspondence between IV fields and value fields, since a single block IV value corresponds to a block if sequential instructions. In a process block 2155, the protection algorithm is applied to each value to generate encrypted values for insertion into the value fields. In the case of instructions, each plaintext instruction is encrypted and inserted into a value field (e.g., value fields 405) of the ciphertext. Each value field is a function of at least its corresponding plaintext instruction and an IV value or a previous plaintext instruction. In a process block 2160, an integrity value is generated for each value field. The integrity value is a function of at least its corresponding plaintext instruct. Once generated, each integrity value is inserted into an integrity field (e.g., integrity fields 410) of the ciphertext. Once the value fields, integrity fields, and IV fields of the trust object have been populated, process 2100 continues to process block 2130, as described above.

Figure 22:
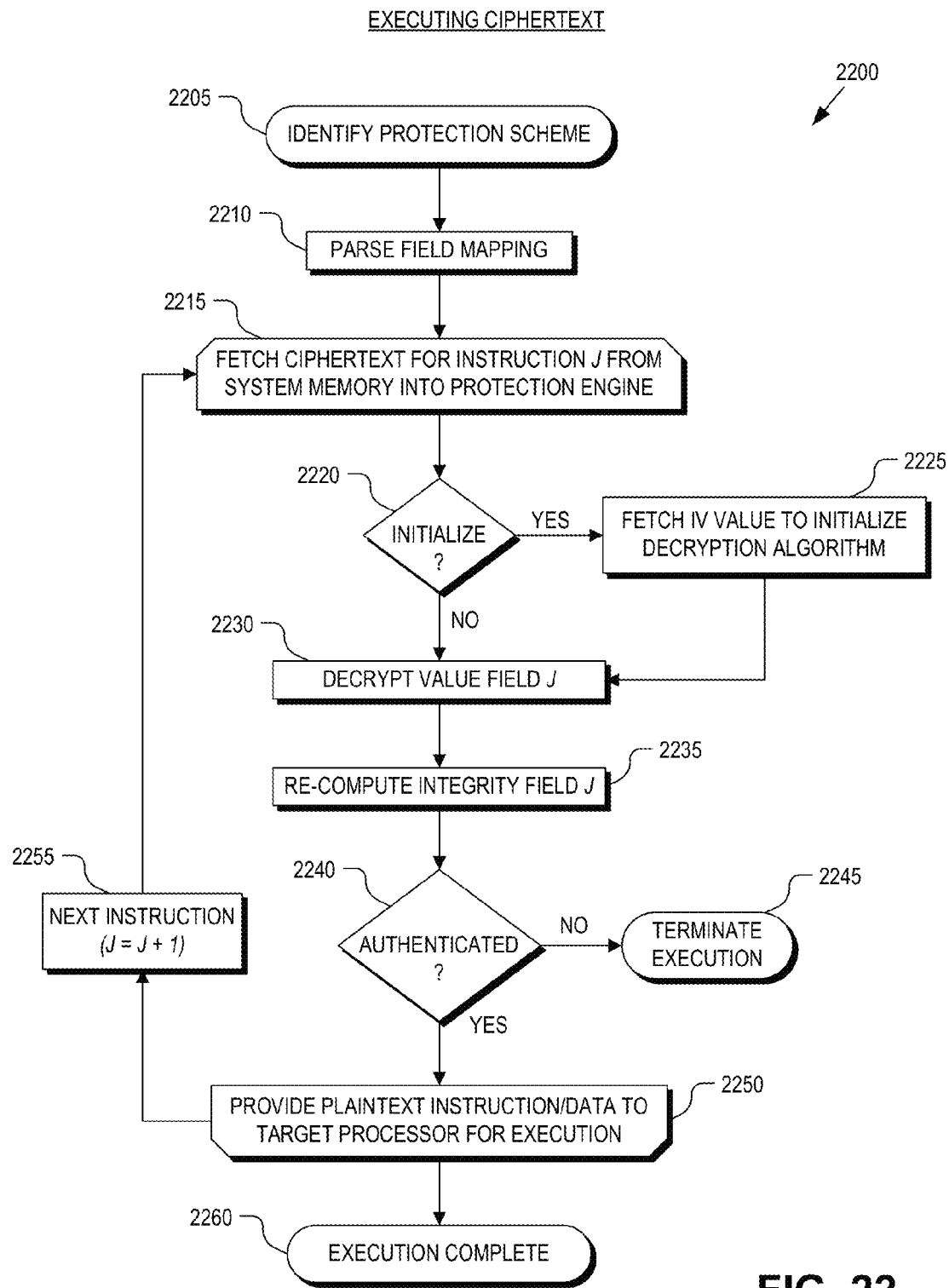
FIG. 22 is a flow chart illustrating a process for executing ciphertext, in accordance with embodiments of the invention.

FIG. 22 is a flow chart illustrating a process 2200 for executing ciphertext, in accordance with embodiments of the invention. Process 2200 may be implemented by CAPA system 220 in real-time to fetch, remove protection, and execute a ciphertext stored in system memory 225. The order in which some or all of the process blocks appear in process 2200 should not be deemed limiting. Rather, one of ordinary skill in the art having the benefit of the present disclosure will understand that some of the process blocks may be executed in a variety of orders not illustrated.

In a process block 2205, the protection (encryption) scheme used to protect the ciphertext or trusted object is identified. In one embodiment, the protection scheme is identified by protection engine 230 with reference to indication of encryption scheme 425 embedded within or appended to trusted object 400. In alternative embodiments, the encryption scheme may be assumed by protection engine 230. In a process block 2210, protection engine 230 inspects field mapping 430 to determine how the various fields of trusted object 400 have been stored to associate value fields 405 with their corresponding integrity fields 410 and IV fields 415. If the mapping is assumed or otherwise already available to protection engine 230, then process block 2210 may be omitted.

Once the protection scheme has been identified and the field mappings determined, process 2200 enters a loop 2215-2250 to fetch, decrypt, and execute each instruction of the ciphertext. In some embodiments, protection engine 230 may operate transparently to target processor 235 who executes the decrypted instructions provided to it by protection engine 230.

In a process block 2215, protection engine 230 fetches instruction/from a value field in system memory 225. In some embodiments, protection engine 230 may also prefetch an integrity field and IV field corresponding to the current value field at the same time. In some embodiments, all IV fields may be prefetched in advance as a group. In a decision block 2220, protection engine 230 determines whether the decryption algorithm needs to be initialized with an IV value for the fetched instruction j. The decryption algorithm may need to be initialized if the fetch instruction is the first instruction of a sequential instruction block, if the instruction is the target of a jump instruction, as well as, other scenarios as described above. If initialization is required, then the corresponding IV value is fetched in a process block 2225.

In a process block 2230, the fetched value field j is decrypted to extract its corresponding plaintext instruction. In a process block 2235, the corresponding integrity field j is re-computed based at least in part on the decrypted plaintext instruction, and in some embodiments depending upon the protection scheme and protection algorithm also based at least in part on the memory address location of instruction j. In decision block 2240, the re-computed integrity value is compared to an integrity value fetched from an integrity field within the ciphertext mapped to the current value field being decrypted. If the two integrity values match, then the plaintext instruction is authenticated. If they do not match, then execution is terminated by protection engine 230 (process block 2245) before protection engine 230 delivers the unauthenticated plaintext instruction to target processor 235 for execution. On the other hand, if the integrity values do match, then protection engine 230 delivers the plaintext instruction j to target processor 235 for immediate execution (process block 2250). Loop 2215-2250 continues at process block 2255 moving onto the next instruction and looping back to process block 2215 until the entire program has been executed or a fault occurs (e.g., an instruction fails to authenticate), at which point execution is complete (process block 2260).

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

A machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A processing system, comprising:
   system memory to store a ciphertext including value fields each including an encrypted executable instruction and integrity fields each including an integrity value for determining whether a corresponding one of the value fields has been modified, wherein the value fields are distinct from the integrity fields;
   a target processor to execute plaintext instructions decoded from the ciphertext; and
   a protection engine coupled between the system memory and the target processor, the protection engine including logic to:
   retrieve the ciphertext from the system memory;
   decrypt the value fields into the plaintext instructions, wherein the ciphertext is encrypted using a stateless encryption scheme and wherein the logic to decrypt the value fields into the plaintext instructions includes logic to generate a plaintext instruction v for each of the value fields by applying one of the following decryption functions to the value fields:

$v = d(VF) \oplus a$, $v = d(VF) \oplus g(a)$, or $v = b(d(VF) \oplus g(a))$, where v represents the plaintext instruction, d and b represents invertible decryption functions, g represents a non-invertible encryption function, VF represents encrypted contents of a value field, a represents an address in the system memory, and $\oplus$ represents an XOR or XNOR operator;
   perform an integrity check based on the integrity fields to determine whether any of the corresponding value fields have been modified; and
   provide the plaintext instructions to the target processor for execution.

2. The processing system of claim 1, wherein the integrity value of each of the integrity fields comprises a first integrity value and wherein the logic to perform the integrity check comprises logic to:
   re-compute a second integrity value for each of the integrity fields based at least in part on a corresponding decrypted plaintext instruction; and compare the second integrity value to the first integrity value for each of the integrity fields to determine whether any of the corresponding value fields have been modified.

3. The processing system of claim 2, wherein the value fields are encrypted using one or more invertible encryption functions and the integrity fields are encrypted using one or more non-invertible encryption functions.

4. The processing system of claim 3, wherein the value fields and the integrity fields are each a function of their corresponding plaintext instruction and their corresponding address locations in the system memory to address anchor the value fields and the integrity fields of the ciphertext to addresses of the system memory.

5. The processing system of claim 2, wherein the logic to re-compute the second encrypted integrity value for each of the integrity fields includes logic to determine if one of the following functions is true:

$$IF = e(v \oplus a)?,$$

$$IF = f(v \oplus a)?,$$

$$IF = f(v \oplus h(a))?, \text{ or}$$

$$IF = f(i(v) \oplus h(a))?,$$

where v represents the plaintext instruction, e represents an invertible encryption function, $f$, h, and i represent noninvertible encryption functions, a represents an address in the system memory, and $\oplus$ represents an XOR or XNOR operator.

6. A non-transitory computer-readable storage medium that provides instructions that, if executed by a computer, will cause the computer to convert an unencrypted software program including plaintext instructions into a ciphertext by performing operations comprising:
- encrypting the plaintext instructions into encrypted instructions using an encryption scheme;
- inserting each of the encrypted instructions into a corresponding value field of the ciphertext;
- generating an integrity value for each of the value fields, the integrity value being an encrypted value different than its corresponding one of the encrypted instructions for determining whether its corresponding one of the encrypted instructions has been modified;
- inserting each of the integrity values into a corresponding integrity field of the ciphertext, wherein the value field is distinct from the integrity field; and
- generating a field mapping field of the ciphertext and inserting field mapping data into the field mapping field for associating a given value field to a given integrity field to guide a decryption engine while decrypting the ciphertext.

7. The non-transitory computer-readable storage medium of claim 6, wherein the value fields are encrypted with one or more invertible encryption functions and the integrity fields are encrypted with one or more non-invertible encryption functions.

8. The non-transitory computer-readable storage medium of claim 7, wherein the value fields and the integrity fields are each a function of their corresponding plaintext instruction and their corresponding address locations in memory to address anchor the value fields and the integrity fields of the ciphertext to addresses of the memory.

9. The non-transitory computer-readable storage medium of claim 8, wherein the encryption scheme uses a stateless encryption method and wherein:
- encrypting the plaintext instructions for inserting into the value fields comprises applying one of a following value field encryption functions:

$$e(v \oplus a),$$

$$e(v \oplus (a)), \text{ or}$$

$$e(c(v) \oplus (a)); \text{ and}$$

- generating the integrity values for the integrity fields comprises applying one of a following integrity field encryption functions:

$$e(v \oplus a),$$

$$f(v \oplus a),$$

$$f(v \oplus h(a)), \text{ or}$$

$$f(i(v) \oplus h(a)),$$

where e and c represent invertible encryption functions, v represents a plaintext instruction, $f$, g, h, and i represent noninvertible encryption functions, a represents a memory address of v, and $\oplus$ represents an XOR or XNOR operator.

10. The non-transitory computer-readable storage medium of claim 6, further providing instructions that, if executed by the computer, will cause the computer to perform further operations, comprising:
- generating initialization vectors (IV) values each for initializing a stateful decryption scheme to decrypt an associated portion of the encrypted instructions within the value fields.

11. The non-transitory computer-readable storage medium of claim 10, wherein the IV values comprise block IV values each for initializing the stateful decryption scheme to decrypt a first instruction in a block of sequential instructions.

12. The non-transitory computer-readable storage medium of claim 10, wherein the IV values comprise jump IV values each for initializing the stateful decryption scheme to decrypt a target instruction which is a target of a jump instruction.

13. The non-transitory computer-readable storage medium of claim 12, wherein all jump IV values associated with multiple jump instructions sharing a single jump target instruction are identical.

14. The non-transitory computer-readable storage medium of claim 10, wherein the encryption scheme uses a stateful encryption scheme and wherein:
- encrypting the plaintext instructions for inserting into the value fields comprises applying one of a following value field encryption functions:

$$C_j = P_{j-1} \oplus e(P_j),$$

where $P_{j-1}$ = an IV value when j=0, or $$C_j = f(P_{j-1}) \oplus e(P_j),$$

where $f(P_{j-1})$ = an IV value when j=0; and
- generating the integrity values for the integrity fields comprises applying one of a following integrity field encryption functions:

$$I_j = f(P_{j-1}) \oplus g(P_j),$$

where $P_j$ = an IV value when j=0, $$I_j = f(P_{j-1} \oplus A_{j-1}) \oplus g(f(P_j \oplus A_j)),$$

where $(P_{j-1} \oplus A_{j-1})$ = an IV value when j=0, $$I_j = f(h(P_{j-1}) \oplus i(A_{j-1})) \oplus g(f(h(P_j) \oplus i(A_j))),$$

where $(h(P_{j-1}) \oplus i(A_{j-1}))$ = an IV value when $j=0$, $$I_j = f(P_j \oplus A_j),$$ or $$I_j = f(g(P_j) \oplus h(A_j)),$$

where e and c represent invertible encryption functions, P represents a plaintext instruction, $f$, g, h, and i represent noninvertible encryption functions, A represents a memory address of P, and $\oplus$ represents an XOR or XNOR operator.

15. A method implemented by a trusted volume including a protection engine coupled between a target processor and a memory unit, the method comprising:
    retrieving a ciphertext from the memory unit into the protection engine, the ciphertext including value fields each including an encrypted executable instruction and integrity fields each including an encrypted integrity value, wherein the value fields are distinct from the integrity fields, the ciphertext further including a field mapping field;
    inspecting the field mapping field to determine how the value fields are associated with the integrity fields, wherein each value field has a corresponding integrity field;
    decoding the value fields into plaintext instructions;
    performing integrity checks based on the integrity fields to determine if any of the value fields have been modified;
    providing the plaintext instructions to the target processor; and
    executing the plaintext instructions on the target processor.

16. The method of claim 15, wherein the encrypted integrity value of each of the integrity fields comprises a first encrypted integrity value and wherein performing integrity checks based on the integrity fields comprises:
    re-computing a second encrypted integrity value for each of the integrity fields based at least in part on corresponding decrypted plaintext instructions; and
    comparing the second encrypted integrity value to the first encrypted integrity value for each integrity field to determine whether any of the corresponding value fields have been modified.

17. The method of claim 16, wherein the value fields are encrypted with one or more invertible encryption functions and the integrity fields are encrypted with one or more noninvertible encryption functions.

18. The method of claim 17, wherein the value fields and the integrity fields are each a function of their corresponding plaintext instruction and their corresponding address locations in the system memory to address anchor the value fields and the integrity fields of the ciphertext to addresses of the system memory.

19. The method of claim 18, wherein re-computing the second encrypted integrity value for each of the integrity fields comprises determining if one of the following functions is true:

$$IF = e(v \oplus a)?,$$

$$IF = f(v \oplus a)?,$$

$$IF = f(v \oplus h(a))?,$$ or $$IF = f(i(v) \oplus h(a))?,$$

where v represents the plaintext instruction, e represents an invertible encryption function, $f$, h, and i represent noninvertible encryption functions, a represents an address in the system memory, and $\oplus$ represents an XOR or XNOR operator.

20. The method of claim 17, wherein consecutive value fields of the ciphertext are linked by using the plaintext instruction associated with a previous value field to encrypt a current value field.

21. The method of claim 20, further comprising:
    temporarily storing initialization vector (IV) values to an IV register, each of the IV values for initializing a decryption algorithm to decrypt a portion of the value fields.

22. The method of claim 21, further comprising:
    setting the IV register with a freshly computed IV value after decrypting each plaintext instruction; and
    using the freshly computed IV value in the IV register to decrypt a next value field if an IV field associated with the next value field is zero.

23. The method of claim 21, further comprising:
    setting the IV register with a freshly computed IV value after decrypting each plaintext instruction, if an IV field associated with a current value field being decrypted is zero; and
    setting the IV register with the IV value of the IV field associated with the current value field being decrypted, if the IV field associated with the current value field is nonzero.

* * * * *